:::

United States Patent
Kojima et al.

(10) Patent No.: US 11,967,233 B2
(45) Date of Patent: Apr. 23, 2024

(54) MANAGEMENT DEVICE, SHARED VEHICLE, VEHICLE SHARING SYSTEM, INFORMATION PROCESSING PROGRAM, AND RECORDING MEDIUM

(71) Applicant: Omron Corporation, Kyoto (JP)

(72) Inventors: Hideaki Kojima, Aichi (JP); Masashi Sato, Aichi (JP); Takanori Oka, Aichi (JP)

(73) Assignee: Omron Corporation, Kyoto (JP)

( * ) Notice: Subject to any disclaimer, the term of this patent is extended or adjusted under 35 U.S.C. 154(b) by 750 days.

(21) Appl. No.: 16/337,745

(22) PCT Filed: Sep. 25, 2017

(86) PCT No.: PCT/JP2017/034476
§ 371 (c)(1),
(2) Date: Mar. 28, 2019

(87) PCT Pub. No.: WO2018/079155
PCT Pub. Date: May 3, 2018

(65) Prior Publication Data
US 2021/0287540 A1 Sep. 16, 2021

(30) Foreign Application Priority Data
Oct. 28, 2016 (JP) ................. 2016-211911

(51) Int. Cl.
*G08G 1/133* (2006.01)
*G01C 21/34* (2006.01)
*G07C 5/00* (2006.01)

(52) U.S. Cl.
CPC ......... *G08G 1/133* (2013.01); *G01C 21/3438* (2013.01); *G07C 5/008* (2013.01)

(58) Field of Classification Search
CPC ..... G08G 1/133; G01C 21/3438; G07C 5/008
(Continued)

(56) References Cited

U.S. PATENT DOCUMENTS 6,941,197 B1 9/2005 Murakami et al.
2010/0280700 A1 11/2010 Morgal et al.
(Continued)

FOREIGN PATENT DOCUMENTS

CN 101645186 A 2/2010
CN 102700426 A 10/2012
(Continued)

OTHER PUBLICATIONS

International Search Report issued in Application No. PCT/JP2017/034476, dated Oct. 24, 2017 (2 pages).
(Continued)

*Primary Examiner* — Maceeh Anwari
(74) *Attorney, Agent, or Firm* — Osha Bergman Watanabe & Burton LLP

(57) ABSTRACT

To provide a vehicle sharing system that allows the user to use a shared vehicle having a battery with a reduced risk of the battery running out, a management server (1) includes a management information database (122) configured to store information on (i) a plurality of shared-vehicle standby locations (2) at each of which a motor-assisted bicycle(s) (3) having a battery (302) is on standby, (ii) a motor-assisted bicycle(s) (3), and (iii) the destination desired by the user; and a location specifying section (115) configured to, in a case where the location specifying section (115) has determined that the remaining battery power of the motor-assisted bicycle (3) that the user is using is not enough to continue to travel to the destination desired by the user, specify a transfer location.

9 Claims, 20 Drawing Sheets

(58) Field of Classification Search
USPC .......................................................... 701/117
See application file for complete search history.

(56) References Cited

U.S. PATENT DOCUMENTS

2012/0019204 A1   1/2012  Matsuo et al.
2017/0098176 A1*  4/2017  Hirose ................... G06Q 10/20

FOREIGN PATENT DOCUMENTS

| CN | 103236177 A | 8/2013 |
| EP | 3121769 A1 | 1/2017 |
| JP | 2010-170293 A | 8/2010 |
| JP | 2011/170686 A | 9/2011 |
| JP | 2013-46494 A | 3/2013 |
| JP | 2014032460 A * | 2/2014 |
| JP | 2014135822 A | 7/2014 |
| JP | 2015-60452 A | 3/2015 |
| JP | 5773706 B2 | 9/2015 |
| JP | 2015-203892 A | 11/2015 |
| JP | 2015203892 A * | 11/2015 |
| JP | 5857581 B2 | 2/2016 |
| KR | 20130036817 A | 4/2013 |
| WO | 2009/059164 A2 | 5/2009 |
| WO | 2015/141291 A1 | 9/2015 |

OTHER PUBLICATIONS

Written Opinion issued in International Application No. PCT/JP2017/034476, dated Oct. 24, 2017 (10 pages).
Extended European Search Report issued in counterpart European Patent Application No. 17864606.3, dated Mar. 18, 2020 (8 pages).
Extended European Search Report issued in European Application No. 23168851.6, dated Jul. 31, 2023 (14 pages).
Office Action in the counterpart Chinese Application No. 201780060558.0, dated Jun. 25, 2023 (21 pages).
Office Action issued in Chinese Application No. 201780060558.0 dated Dec. 5, 2022 (24 pages).
Office Action in the counterpart Chinese Application No. 201780060558.0, mailed Jan. 5, 2024 (21 pages).

* cited by examiner

FIG. 6

| BICYCLE ID | RENTAL (STANDBY) LOCATION ID | PORT NUMBER | MEMBER ID | PLANNED RENTAL DATE AND TIME | RENTAL FLAG | PLANNED RETURN DATE AND TIME | PLANNED RETURN LOCATION ID |
|---|---|---|---|---|---|---|---|
| 0001 | A-1 | A-01 | 1111 | 2016/9/10 8:00 | RENTED OUT | 2016/9/10 15:00 | E-9 |
| 0105 | B-5 | B-03 | 2222 | 2016/9/20 10:00 | | 2016/9/20 10:00 | F-3 |
| | | | | | | | |
| | | | | | | | |
| | | | | | | | |

FIG. 12

| LOCATION | OCCUPANCY |
| --- | --- |
| C-1 | 20% |
| C-2 | 50% |
| D-1 | 30% |
| E-3 | 80% |
| E-4 | 60% |

FIG. 13

| | | REMAINING BATTERY POWER | | | | | | | | |
| --- | --- | --- | --- | --- | --- | --- | --- | --- | --- | --- |
| | | 0-10% | 11-20% | 21-30% | 31-40% | 41-50% | 51-60% | 61-70% | 71-80% | 81-90% | 91-100% |
| LOCATION | C-1 | 10% | 0% | 0% | 40% | 40% | 0% | 0% | 0% | 0% | 10% |
| | C-2 | 0% | 0% | 20% | 30% | 0% | 10% | 10% | 10% | 20% | 0% |
| | D-1 | 10% | 0% | 0% | 0% | 0% | 0% | 40% | 40% | 0% | 10% |
| | E-3 | 0% | 0% | 20% | 30% | 0% | 10% | 10% | 10% | 20% | 0% |
| | E-4 | 20% | 30% | 0% | 10% | 10% | 0% | 0% | 10% | 20% | 0% |

FIG. 14

|  | RENTAL LOCATION | C-1 | C-2 | D-1 | E-3 | E-4 | RETURN LOCATION |
|---|---|---|---|---|---|---|---|
| RENTAL LOCATION |  |  |  |  |  |  |  |
| C-1 | 30% |  |  |  |  |  |  |
| C-2 | 40% | 10% |  |  |  |  |  |
| D-1 | 50% | 20% | 10% |  |  |  |  |
| E-3 | 60% | 30% | 20% | 10% |  |  |  |
| E-4 | 70% | 40% | 30% | 20% | 10% |  |  |
| RETURN LOCATION | 80% | 50% | 40% | 30% | 20% | 10% |  |

FIG. 18

| STORE NAME | COORDINATES | AVERAGE LENGTH OF STAY | CATEGORY |
|---|---|---|---|
| ** STORE | xxx:yyy | 1 HOUR | EAT AND DRINK |
| ** TEMPLE | xxx:yyy | 30 MINUTES | SIGHTSEEING PLACE |
| | | | |
| | | | |
| | | | |
| | | | |
| | | | |

MANAGEMENT DEVICE, SHARED VEHICLE, VEHICLE SHARING SYSTEM, INFORMATION PROCESSING PROGRAM, AND RECORDING MEDIUM

TECHNICAL FIELD

The present invention relates to, for example, a management device configured to manage a vehicle sharing system for sharing a vehicle having a battery.

BACKGROUND ART

There has been known a bicycle sharing service that allows the user to readily rent out a shared bicycle.

A typical bicycle sharing service is based on staffed or unstaffed bicycle ports (rental/return places) at a plurality of places within a particular region. The user can rent out a shared bicycle at a bicycle port and return it at another or predetermined bicycle port (for example, the bicycle port at which the user has rented out the shared bicycle) after the use. There is also a bicycle sharing service that allows the user to use a mobile telephone to, for example, reserve a shared bicycle or request to end the use.

Patent Literature 1, for example, discloses a bicycle sharing system that allows the user to request to end the use as follows: When the user has requested to end the use on a mobile telephone screen, information on the request is transmitted to a reservation management server together with GPS information on the shared motor-assisted bicycle that the user is using (that is, position information). The reservation management server, on the basis of the GPS information, extracts two or so bicycle parking lots (which are incorporated in the bicycle sharing system) near the current position of the user. The reservation management server also refers to information on the occupancy of each of those bicycle parking lots to send, to the user, return place candidate information including information to the effect that the user is requested to return the motor-assisted bicycle at any of those bicycle parking lots if possible. The user then selects a desired bicycle parking lot as a return place from among the return place candidates displayed on the mobile telephone screen, and returns the shared motor-assisted bicycle at the return place.

Patent Literature 1 discloses a technique related to a bicycle sharing system with which technique a reservation management server obtains information on the remaining battery power of a shared motor-assisted bicycle and prompts the user to change bicycles as necessary. Specifically, while the user is using a shared motor-assisted bicycle, information on the remaining battery power is transmitted to a reservation management server together with GPS information on the bicycle. In a case where the reservation management server has determined that the remaining battery power of the motor-assisted bicycle is low, the reservation management server causes a mobile telephone of the user's to display the message "You can use this bicycle for another certain time period (for example, three hours). If you want to continue to use it for a longer time period, you need to change bicycles at a nearby bicycle parking lot within 45 minutes. Do you want to use this bicycle for another three hours or longer?". The user thus has an option of changing bicycles at a bicycle parking lot near the current position.

CITATION LIST

Patent Literature

[Patent Literature 1]
Japanese Patent Application Publication, Tokukai, No. 2015-60452 (Publication date: Mar. 30, 2015)

SUMMARY OF INVENTION

Technical Problem

The bicycle sharing system disclosed in Patent Literature 1 is configured such that while the user is using a shared motor-assisted bicycle, the reservation management server, in a case where the remaining battery power of the bicycle has fallen below a predetermined set value (for example, 15%), determines that the remaining battery power is low and prompts the user to change bicycles. Thus, even if a message has been displayed that prompts the user to change bicycles, there may be no bicycle parking lot near the current position of the user at which bicycle parking lot there is a shared motor-assisted bicycle with which the user can replace the bicycle that the user is using.

Further, the majority of users may each replace the current shared motor-assisted bicycle with another one at a particular bicycle parking lot, so that the particular bicycle parking lot may be filled with motor-assisted bicycles each having an insufficient remaining battery power. A bicycle parking lot may be present in a region that the user reaches after traveling along a road on which the battery of a motor-assisted bicycle is reduced greatly (such as a mountain path having a steep slope). At such a bicycle parking lot, the majority of uses may each change shared motor-assisted bicycles. Thus, there may be no bicycle with which the user can replace the current bicycle when the user wants to. The user, in this case, needs to travel to another bicycle parking lot.

In such cases, the battery of the motor-assisted bicycle that the user is using may run out, which is inconvenient for the user.

The present invention has been accomplished in view of the above issue involved with conventional art. It is an object of the present invention to provide a vehicle sharing system that allows the user to use a shared vehicle having a battery with a reduced risk of the battery running out.

Solution to Problem

In order to attain the above object, a management device in accordance with an aspect of the present invention includes: a management information database configured to store (i) positional information on each of a plurality of vehicle locations at each of which a shared vehicle having a battery is on standby, (ii) standby state information on the shared vehicle on standby at each of the plurality of vehicle locations, (iii) vehicle status information on a remaining battery power of a first shared vehicle that a user is using and on a current position of the first shared vehicle, and (iv) destination information on a desired destination at which the user wants to return the first shared vehicle; a location specifying section configured to, in a case where the location specifying section has determined with reference to the management information database that the remaining battery power of the first shared vehicle is not enough to continue traveling to the desired destination, specify a first vehicle location to be used by the user to change the first shared vehicle to a second shared vehicle; and a notifying section configured to notify a terminal device, operated by the user, of the first vehicle location.

Advantageous Effects of Invention

The present invention advantageously provides a vehicle sharing system that allows the user to use a shared vehicle having a battery with a reduced risk of the battery running out.

BRIEF DESCRIPTION OF DRAWINGS

FIG. 6 is an example of an information management table stored in a management information database.

FIG. 12 is an example table that shows the respective occupancies of shared-vehicle standby locations as transfer location candidates.

FIG. 13 is an example table that classifies, into ten different classes according to the remaining battery power, each motor-assisted bicycle on standby at each shared-vehicle standby location as a transfer location candidate to show the percentage of motor-assisted bicycles in each class of the remaining battery power.

FIG. 14 is an example table that shows the remaining battery power necessary to travel between different shared-vehicle standby locations.

FIG. 18 is a table that shows examples of via-place candidates stored in a management information database.

Figure 19:
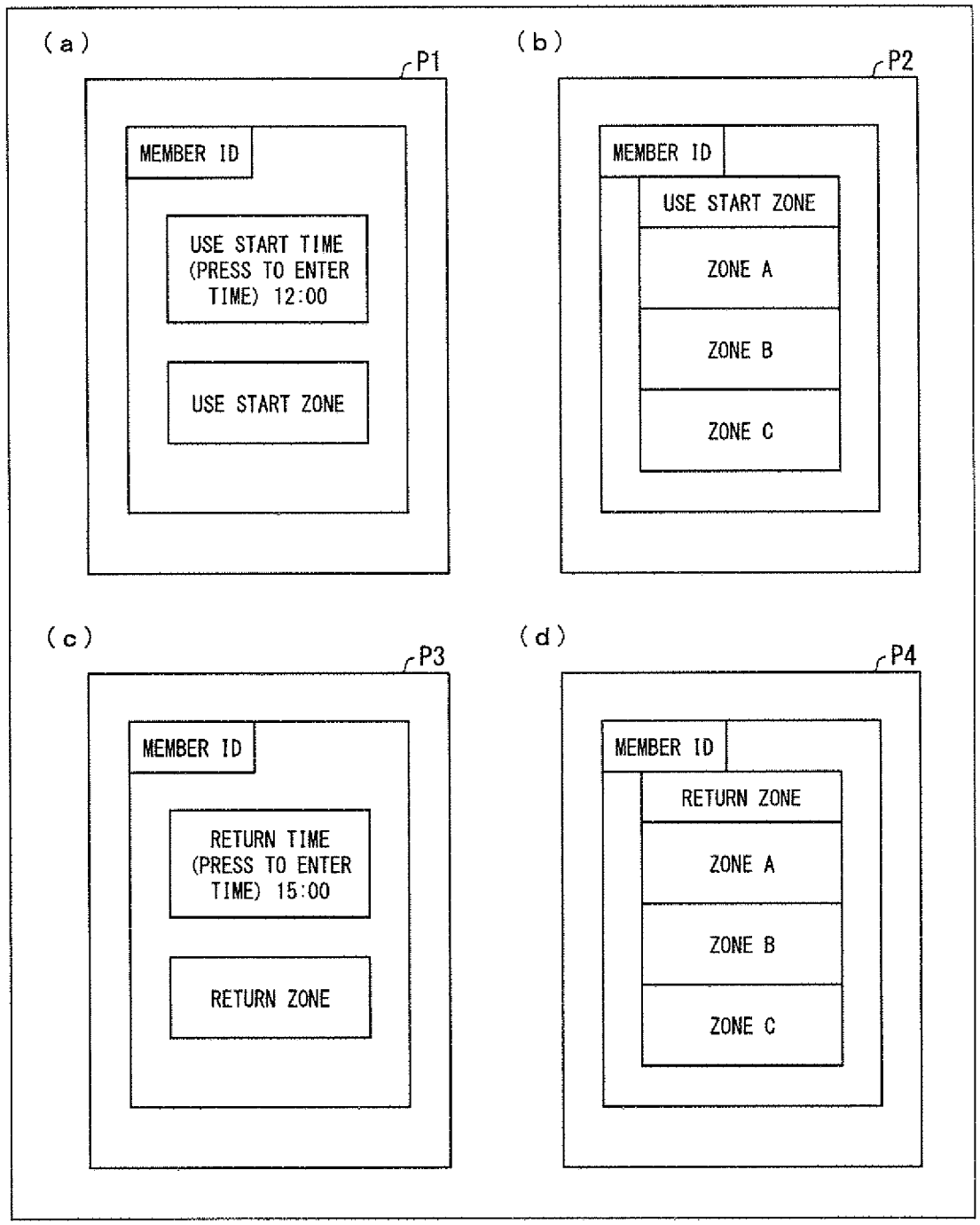

(a) to (d) of FIG. 19 are diagrams illustrating a specific example of transition of screens displayed on a portable terminal in a case where a user requests a use reservation with use of the portable terminal.

Figure 20:
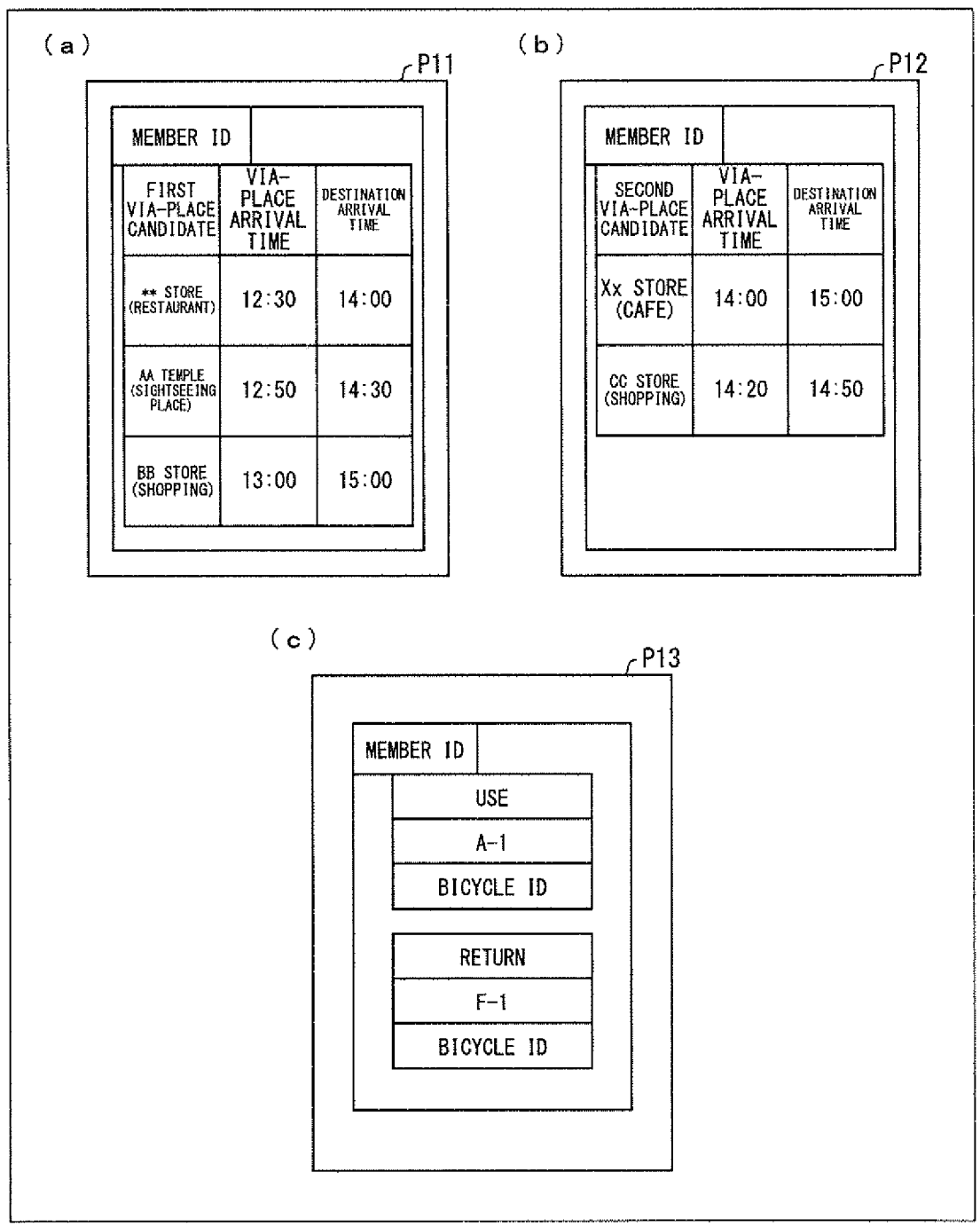

(a) to (c) of FIG. 20 are diagrams illustrating a specific example of transition of screens displayed on a portable terminal in a case where a user requests a use reservation with use of the portable terminal and selects a via-place.

Figure 21:
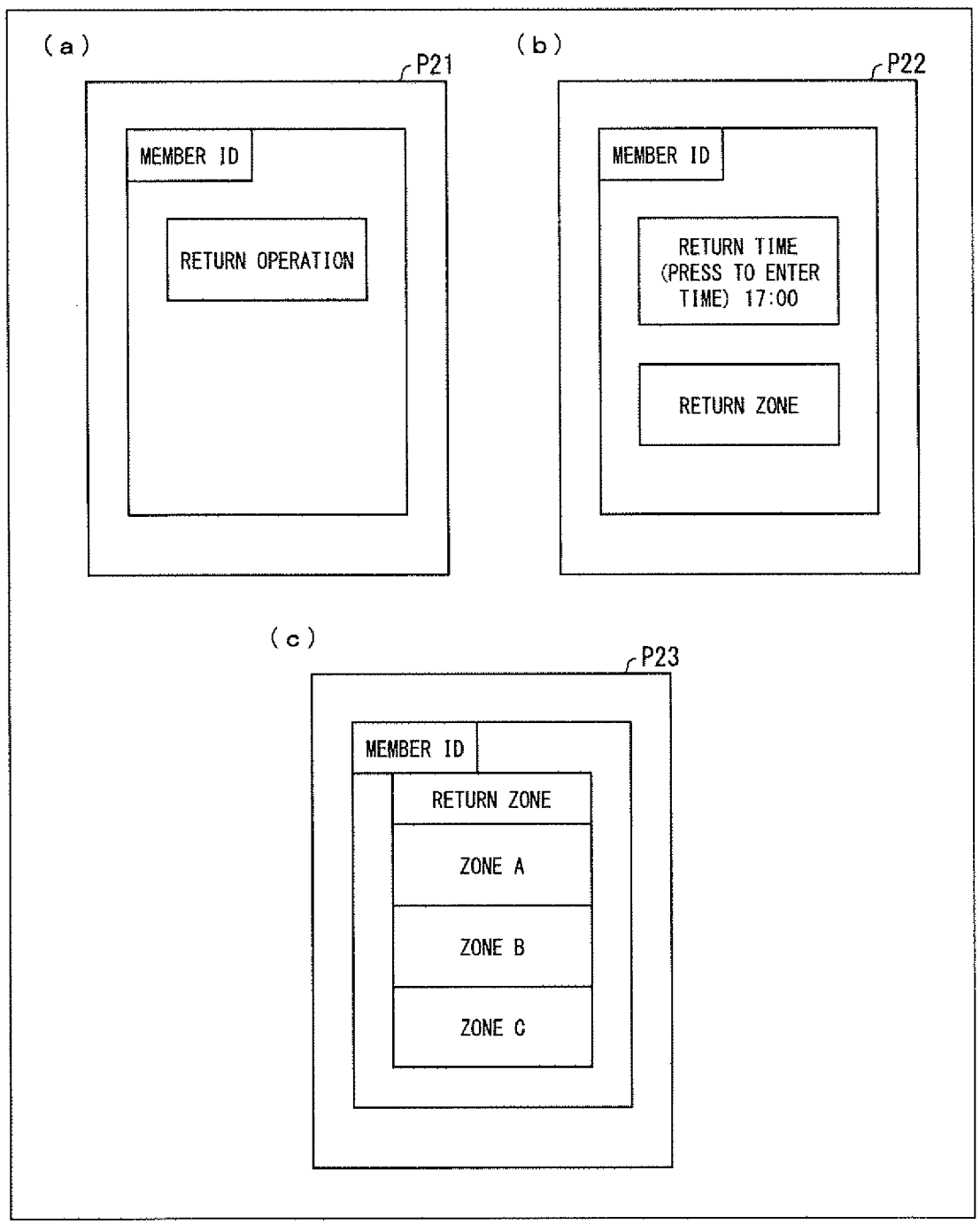

(a) to (e) of FIG. 21 are diagrams illustrating a specific example of transition of screens displayed by a bicycle-mounted terminal in a case where a user changes the destination or planned return date and time during use of a motor-assisted bicycle.

Figure 22:
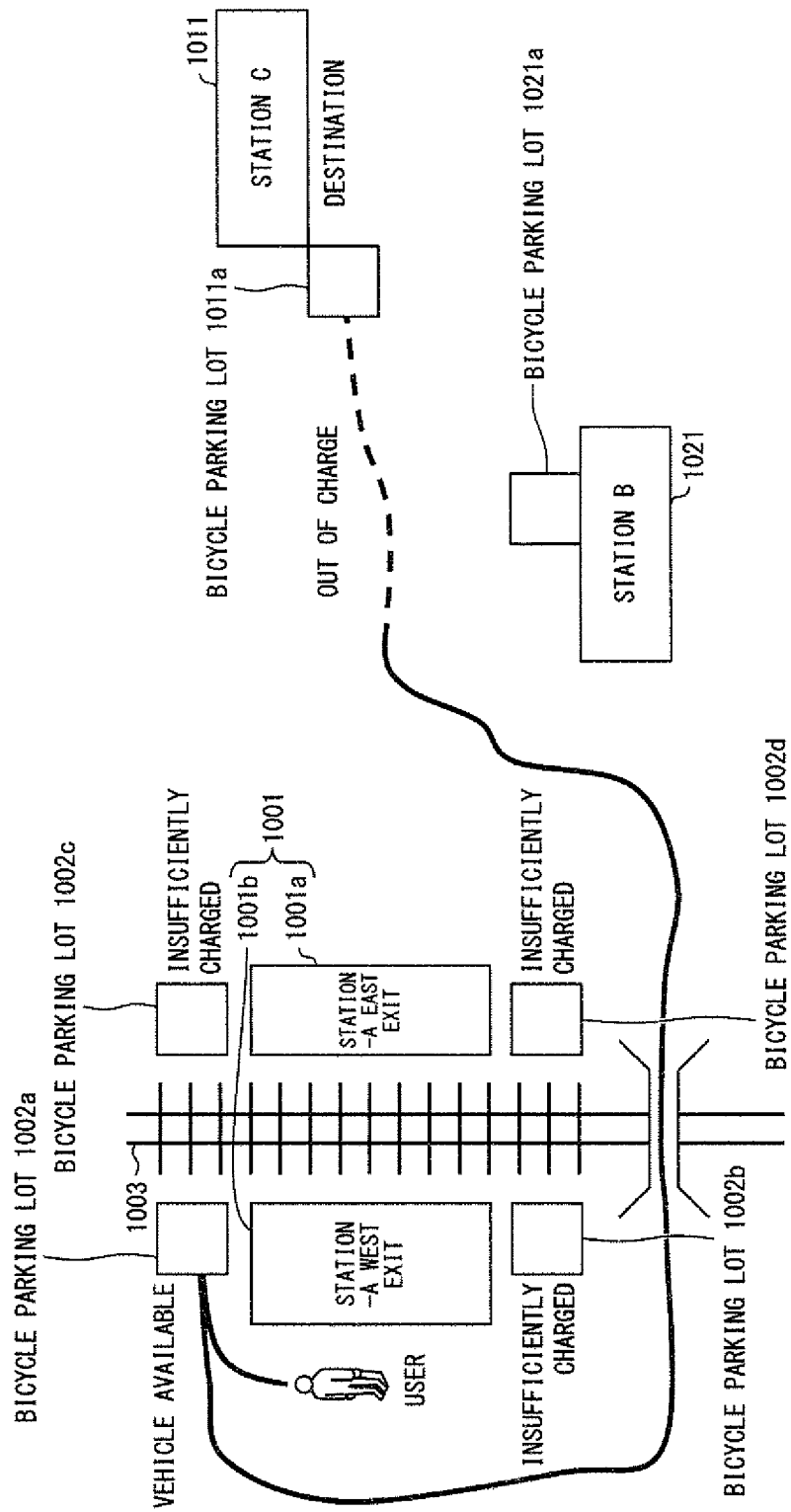

FIG. 22 is a diagram illustrating an example situation in which a user uses a conventional bicycle sharing system to travel with use of a motor-assisted bicycle.

DESCRIPTION OF EMBODIMENTS

The following description will discuss an embodiment of the present invention with reference to FIGS. 1 to 22. Identical or equivalent elements in the drawings are assigned an identical reference sign, and are not described repeatedly.

The present embodiment described here is, as an example of the management device configured to manage a vehicle sharing system for sharing a vehicle having a battery, a management server configured to manage a vehicle sharing system (bicycle sharing system) for sharing a motor-assisted bicycle. The management device of an embodiment of the present invention is not necessarily limited to such a configuration. The present embodiment is applicable to a vehicle sharing system (service) for sharing any of various vehicles each having a battery such as an electric motorcycle, an electric automobile, and a motor-powered stand-up two-wheeled vehicle.

The description below first deals with an overview of a bicycle sharing system 10 as an aspect of the present invention with reference to FIGS. 2 and 3. The individual elements of the bicycle sharing system 10 as an aspect of the present invention are not limited to those specifically described with reference to FIG. 2. The portable terminal described later may be, for example, a communication terminal such as a desktop or laptop personal computer. The management server may be replaced with a plurality of servers.

Bicycle Sharing System 10

Figure 2:
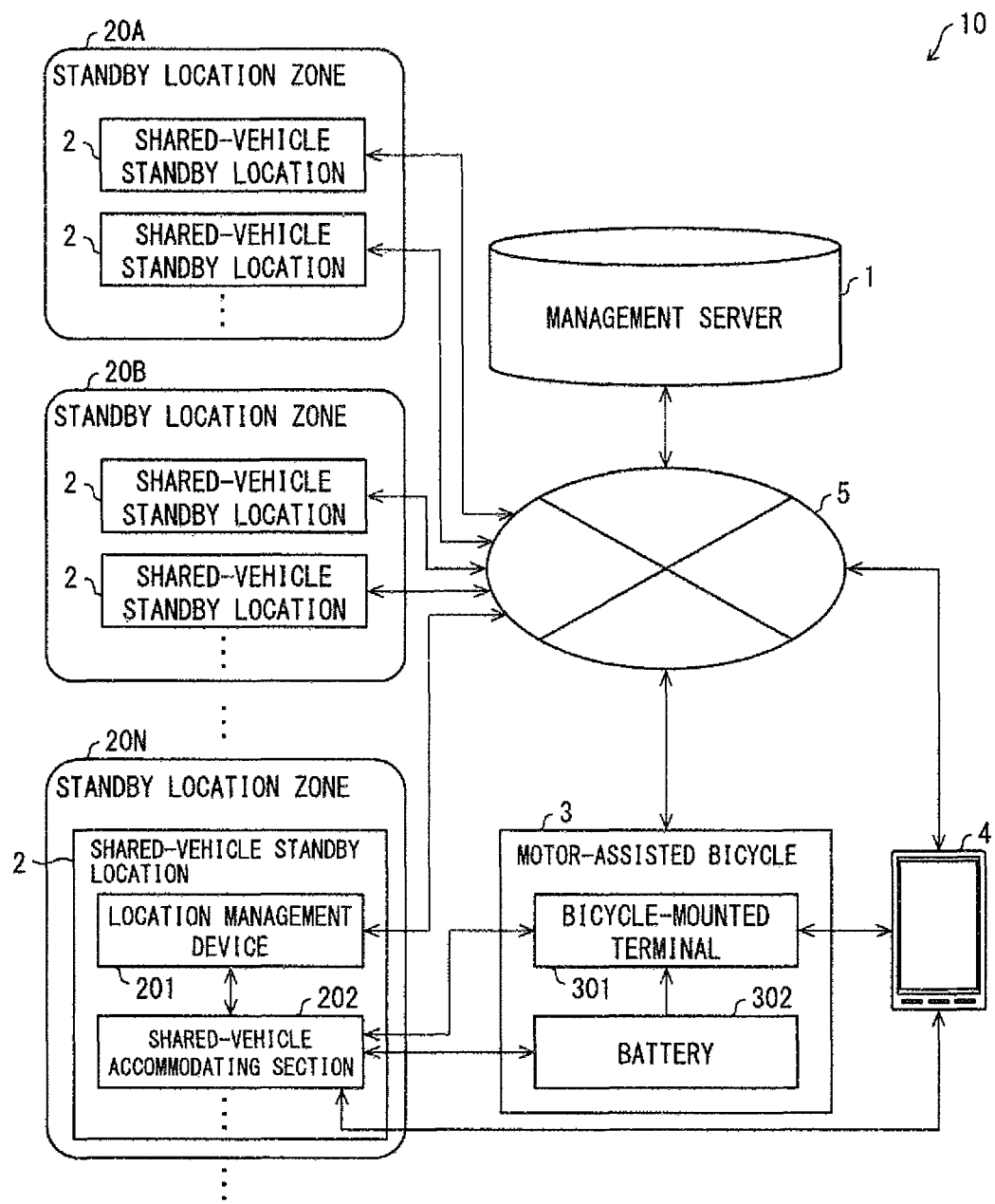
FIG. 2 is a diagram schematically illustrating a bicycle sharing system of an embodiment of the present embodiment.

FIG. 2 is a diagram schematically illustrating a bicycle sharing system 10 of the present embodiment. For simple illustration, FIG. 2 schematically illustrates the configuration of only one of a plurality of shared-vehicle standby locations 2. The other shared-vehicle standby locations 2 are configured similarly.

As illustrated in FIG. 2, the bicycle sharing system (vehicle sharing system) 10 includes a plurality of shared-vehicle standby locations (vehicle locations) 2, a motor-assisted bicycle 3 as a shared vehicle, a portable terminal (terminal device) 4, and a management server (management device) 1. These are connected to one another in such a manner as to be communicable over a communication network 5.

The description below outlines the bicycle sharing system 10. The bicycle sharing system 10 offers the user a service that allows the user to rent a motor-assisted bicycle 3 on standby at a shared-vehicle standby location 2 to travel from a desired starting place to a desired destination. The user, for instance, uses a portable terminal 4 to access a reservation management website provided by the management server 1 and requests a reservation to use a motor-assisted bicycle 3. The user may alternatively use the location management device 201 described later to request a reservation for the use. The user may alternatively use application software installed on the portable terminal 4 to request a reservation for the use.

When requesting a use reservation, the user enters not only starting-place information (that is, information on a desired starting place) but also destination information (that is, information on a desired destination). The user also enters a desired date and time of starting the use and a desired date and time of ending the use. The description below uses the term "desired reservation information" as well to refer to the above items of information that the user enters when requesting a use reservation. The management server 1, on the basis of the desired reservation information and various items of information that the management server 1 stores, selects (specifies), as a rental location, a suitable shared-vehicle standby location 2 among two or more shared-vehicle standby locations 2 near the starting place, specifies a motor-assisted bicycle 3 to be rented out (hereinafter referred to also as "rental bicycle"), and notifies the user of the motor-assisted bicycle 3 specified (details described later). The management server 1 also specifies, as a return location, a suitable shared-vehicle standby location 2 among two or more shared-vehicle standby locations 2 near the destination. The rental location can be expressed as a shared-vehicle standby location 2 that the user should use when renting out a motor-assisted bicycle 3. The return location can be expressed as a shared-vehicle standby location 2 that the user should use to return the motor-assisted bicycle 3.

The present embodiment is configured such that the management server 1 carries out an operation to specify a rental location and a rental bicycle substantially simultaneously. The present embodiment may be modified as follows: The management server 1 specifies a rental location and notifies the user of the rental location. When the user operates a location management device 201 placed at the rental location, the location management device 201 or the management server 1 specifies a rental bicycle among a plurality of motor-assisted bicycles 3 on standby at the rental location.

The management server 1, as described above, specifies a suitable shared-vehicle standby location 2 as a rental location. As a specific example, the management server 1 specifies, as a rental location, a suitable shared-vehicle standby location 2 near the starting place with reference to information such as the occupancy of each shared-vehicle standby location 2 and the remaining battery power (that is, the battery level at that time point) of each motor-assisted bicycle 3 on standby. The management server also specifies, as a return location, a suitable shared-vehicle standby location 2 near the destination with reference to the above information. The management server 1 stores information on (i) the remaining battery power of each motor-assisted bicycle 3 on standby at each shared-vehicle standby location 2 and (ii) the remaining battery power needed for a motor-assisted bicycle 3 to move from each shared-vehicle standby location 2 to any other shared-vehicle standby location 2. The management server 1, when specifying a rental location and the like as described above, refers to the above information as well to carry out an operation for selecting a rental location, a rental bicycle, and a return location.

In a case where there is, between the starting place and the destination, a shared-vehicle standby location 2 as a junction location, that is, a shared-vehicle standby location 2 at which the user can change motor-assisted bicycles 3, the management server 1 specifies, as a rental location, a suitable shared-vehicle standby location 2 near the starting place and also selects a rental bicycle in view of the possibility of the user changing motor-assisted bicycles 3 at the shared-vehicle standby location 2 as a junction location. This changing of motor-assisted bicycles 3 may also be expressed as making a connection.

In a case where the user wants to go to the destination via a place (hereinafter referred to as "via-place"), the user enters (selects) the via-place on the reservation management website. The management server 1, in this case, specifies a rental location and a junction location in view of the via-place as well as the starting place and the destination. Specifically, the management server 1 stores information on an estimated length of stay at each candidate selectable as a via-place. The management server 1 then calculates a time leeway for the user on the basis of information on the desired date and time of starting the use and the desired date and time of ending the use (both of which the user entered when requesting the use) as well as information on an estimated length of time required to move from the starting place to the destination. The management server 1 refers to the time leeway and the estimated length of stay when presenting the user with via-place candidates so that the user can select a via-place. The management server 1 refers to the selected via-place when specifying a rental location and a junction location. The management server 1 then specifies (i) a rental bicycle among motor-assisted bicycles 3 on standby at the rental location and (ii) a bicycle to which the user will change the rental bicycle (hereinafter referred to as "transfer bicycle") among motor-assisted bicycles 3 on standby at the junction location.

As described above, the bicycle sharing system 10 is configured such that the management server 1 specifies a rental location with reference to different items of information. This allows the management server 1 to specify a rental location in such a manner that, for instance, the occupancy of each shared-vehicle standby location 2 or the number of motor-assisted bicycles 3 on standby at each shared-vehicle standby location 2 is similar to that for any other shared-vehicle standby location 2. The management server 1 may be configured to specify a rental location on the basis of a criterion that the business operator sets as appropriate or a criterion other than that. This makes it possible to reduce the possibility that a shared-vehicle standby location 2 that is convenient for many users is used much more frequently than other shared-vehicle standby locations 2. The above configuration also allows different motor-assisted bicycles 3 to be used with similar frequencies, thereby preventing a frequently used motor-assisted bicycle 3 from being worn out early.

The requesting of a use reservation as described in the present specification also covers a case in which the user wants an instant use from the time point of the request. In other words, the bicycle sharing system 10 may be further configured, for instance, such that the user can operate the location management device 201 at a shared-vehicle standby location 2 for an instant use from that time point.

The term "occupancy" as used in the present specification refers to the ratio of the number of motor-assisted bicycles 3 (shared vehicles) on standby at a shared-vehicle standby location 2 to the maximum number of motor-assisted bicycles 3 that the shared-vehicle standby location 2 is capable of accommodating.

The following description will outline the individual elements of the bicycle sharing system 10 illustrated in FIG. 2.

A shared-vehicle standby location 2 is a location at which a motor-assisted bicycle(s) 3 is on standby (hereinafter referred to also as "terminal") which location is in a management region (for example, X City or a wider area including a plurality of municipalities) that the service provider (hereinafter referred to as "business operator") manages as a region in which the business operator provides the bicycle sharing system 10. The business operator manages a management server 1, shared-vehicle standby locations 2, and motor-assisted bicycles 3. A shared-vehicle standby location 2 may be staffed with a resident manager for service provision, but basically does not need such a manager. The bicycle sharing system 10 of the present embodiment provides a service that the user can use by communicating with the management server 1 with use of a portable terminal 4 or a location management device 201.

The business operator may establish a plurality of shared-vehicle standby locations 2 in the management region in such a manner that the shared-vehicle standby locations 2 are present locally in an area in which the demand for rental of a motor-assisted bicycle 3 is large such as an area near a train station or a sightseeing spot. The description below uses the term "standby location zone 20" to refer to a geographical zone (partial region) in the management region in which geographical zone the business operator has established at least one shared-vehicle standby location 2. In this case, the management region includes standby location zones 20i (where i=A, B, C, . . . N, . . . ). The number of shared-vehicle standby locations 2 included in each standby location zone 20 is not limited to any particular number, and may vary depending on the standby location zone 20. Neither the number of shared-vehicle standby locations 2 in the management region nor the number of standby location zones 20 in the management region is limited to a particular number. The management server 1 discriminates among shared-vehicle standby locations 2 and among standby location zones 20 on the basis of, for example, an ID unique to each shared-vehicle standby location 2 or each standby location zone 20 for management. The method for the management (discrimination) is not limited to any particular one. A later description will deal with a specific example of standby location zones 20 with reference to FIG. 3.

A standby location zone 20 may be a geographical zone that when the user has requested a use reservation, the management server 1 sets in such a manner that the geographical zone includes at least one shared-vehicle standby location 2 near the current position of the user. A standby location zone 20 may, in other words, be a region that the management server 1 sets variably according to the current position of the user.

Each shared-vehicle standby location 2 includes a location management device 201 and shared-vehicle accommodating sections 202. The location management device 201 is a terminal device installed at the shared-vehicle standby location 2, and transmits, to the management server 1 over the communication network 5, information (standby state information) on each motor-assisted bicycle 3 on standby, that is, each motor-assisted bicycle 3 accommodated by a shared-vehicle accommodating section 202. Each shared-vehicle accommodating section 202 is in the form of what is commonly called a bicycle rack or a docking port. The shared-vehicle accommodating section 202 has the function of accommodating a motor-assisted bicycle(s) 3 (allowing the user to park a motor-assisted bicycle(s) 3), and includes, for example, a wheel stopper and a locking means. The locking means may be unlocked with use of any of various key management systems. For the bicycle sharing system 10 in accordance with an aspect of the present invention, the key management system is not limited to any particular one. The key management system of the present embodiment is merely an example, and may be replaced with another, known key management system.

The location management device 201 includes an input means such as a touch panel. The user can operate the location management device 201 to reserve a motor-assisted bicycle 3 for use. This allows a user who can connect to a domestic communication network but does not own a portable terminal 4 (such as a tourist from overseas) to easily use the bicycle sharing system 10.

A motor-assisted bicycle 3 is a shared vehicle that a user can temporarily use (rent out). The bicycle sharing system 10 includes a large number of motor-assisted bicycles 3. Each motor-assisted bicycle 3 is discriminated from the other motor-assisted bicycles 3 with use of, for example, a unique bicycle ID, and is managed by the management server 1.

Each motor-assisted bicycle 3 includes a bicycle-mounted terminal 301 and a battery 302. The bicycle-mounted terminal 301 has the function of obtaining information on the remaining power of the battery 302 of the motor-assisted bicycle 3 and transmitting the information to the management server 1. The bicycle-mounted terminal 301 includes a monitor for displaying various items of information. The monitor is, for example, installed in the vicinity of the handlebar of the motor-assisted bicycle 3, and displays various items of information to notify the user of those items of information.

The motor-assisted bicycles 3 may be discriminated by any method for management. The bicycle-mounted terminal 301 may be fed with and store the bicycle ID of the motor-assisted bicycle 3 on which the bicycle-mounted terminal 301 is mounted. Alternatively, each motor-assisted bicycle 3 may be provided with a radio frequency identification (RFID) chip that stores information on the bicycle ID of the motor-assisted bicycle 3 so that the bicycle-mounted terminal 301 receives that information for storage of information on the bicycle ID. Further alternatively, each shared-vehicle accommodating section 202 may store information on the bicycle ID of each motor-assisted bicycle 3 that the shared-vehicle accommodating section 202 accommodates and transmit the information to the management server 1. In any case, each motor-assisted bicycle 3 has, for example, a sticker or stamp that shows the bicycle ID of the motor-assisted bicycle 3.

The portable terminal 4 is a communication terminal that the user owns. Examples of the portable terminal 4 include a mobile telephone, a smartphone, and a tablet computer. The portable terminal 4 is capable of communicating with the management server 1, the shared-vehicle accommodating sections 202, and the bicycle-mounted terminal 301 with use of a radio communication means. The user can use the portable terminal 4 to access the reservation management website. The portable terminal 4 may be configured to carry out a near-field communication with a shared-vehicle accommodating section 202 or bicycle-mounted terminal 301 for a locking operation and an unlocking operation. The user may alternatively perform such operations with use of application software installed on the portable terminal 4.

The management server 1 manages not only the reservation management website, but also information on each shared-vehicle standby location 2 and each motor-assisted bicycle 3. The management server 1 is capable of obtaining, over the communication network 5, information (standby state information) on each motor-assisted bicycle 3 on standby which information the corresponding shared-vehicle standby location 2 stores with use of a sensor provided for the shared-vehicle standby location 2. The management server 1 may alternatively be configured to obtain information not with use of the sensor, but from each bicycle-mounted terminal 301. The management server 1 obtains, over the communication network 5, information on each motor-assisted bicycle 3 that a user is using (vehicle status information, that is, information on the current position and the remaining battery power) which information the corresponding bicycle-mounted terminal 301 stores.

To use the bicycle sharing system 10, a user-to-be needs to register for membership. The management server 1 stores various items of user information (registered information) and a member ID in association with each other.

The management server 1 accepts a request for a use reservation from a user and determines whether the request is valid. Specifically, the management server 1 searches its member ID database for the member ID entered. In a case where the request is valid, the management server 1 specifies a shared-vehicle standby location 2 as a rental location and a rental bicycle in the standby location zone 20 that includes the starting place desired by the user, and causes the portable terminal 4 of the user to display information on the specified rental location and rental bicycle.

The management server 1 is further configured to (i) receive, from each motor-assisted bicycle 3 that a user is using, information on the remaining power of the battery 302 and (ii) on the basis of various items of information including the above information, notify the user that the user needs to change motor-assisted bicycles 3 and cause the bicycle-mounted terminal 301 to display information on a shared-vehicle standby location 2 as a changing location and a transfer bicycle.

The communication network 5 is not particularly limited in configuration, and may be a cable communication network or a radio communication network as appropriate. Specific examples include the internet, a telephone network, a mobile communication network, satellite communication, an optical fiber communication network, a wireless LAN, and a near-field radio communication.

The description above has outlined the bicycle sharing system 10 including the management server 1 with reference to FIG. 2. To facilitate understanding of the management server 1 in accordance with an aspect of the present invention, the following description will discuss, with reference to FIG. 22, an issue involved with a conventional bicycle sharing system 1000 when a user uses the bicycle sharing system 1000.

Conventional bicycle sharing system FIG. 22 is a diagram illustrating an example situation in which a user uses a conventional bicycle sharing system 1000 to travel with use of a motor-assisted bicycle. The description below assumes a situation in which as illustrated in FIG. 22, the user starts at Station A 1001, near which there are a bicycle parking lot 1002*a*, a bicycle parking lot 1002*b*, a bicycle parking lot 1002*c*, and a bicycle parking lot 1002*d*, and wants to go to Station C 1011 with use of a motor-assisted bicycle. There is Station B 1021 between Station A 1001 and Station C 1011. There is a railroad track 1003 extending through Station A 1001 and sandwiched between a Station-A east exit 1001*a* and a Station-A west exit 1001*b*.

In the vicinity of Station A 1001, the bicycle parking lot 1002*d* is closer to Station B 1021 and Station C 1011 than the bicycle parking lot 1002*c*; the bicycle parking lot 1002*c* is closer to Station B 1021 and Station C 1011 than the bicycle parking lot 1002*b*; and the bicycle parking lot 1002*b* is closer to Station B 1021 and Station C 1011 than the bicycle parking lot 1002*a*. The user will thus normally prefer to use the bicycle parking lots 1002*b*, 1002*c*, and 1002*d*, regardless of whether the user requests a use reservation. This may result in a situation in which the bicycle parking lots 1002*b*, 1002*c*, and 1002*d* have only insufficiently charged motor-assisted bicycles on standby. In this case, the user will unfortunately end up renting out a motor-assisted bicycle at the bicycle parking lot 1002*a*, which is relatively far from Station C 1011 as the destination. The user may also need to walk to the Station-A west exit 1001*b* after exiting from the Station-A east exit 1001*a*.

Even if the bicycle sharing system 1000 has determined that a motor-assisted bicycle has a remaining battery power that is not less than an appropriate amount and can be rented out, the battery of the motor-assisted bicycle may run out before the user arrives at Station C 1011 if a bicycle parking lot 1011*a* at Station C 1011 is far from the bicycle parking lot 1002*a*.

As described above, the conventional bicycle sharing system 1000 lets a bicycle parking lot convenient for many users be used much more frequently than other bicycle parking lots, and may unfortunately result in a situation inconvenient for users. Further, frequently using a particular motor-assisted bicycle to travel between the preferred bicycle parking lot 1002*d* and the bicycle parking lot 1011*a* unfortunately leads the battery and the like to be worn out relatively early due to the heavy use.

Figure 3:
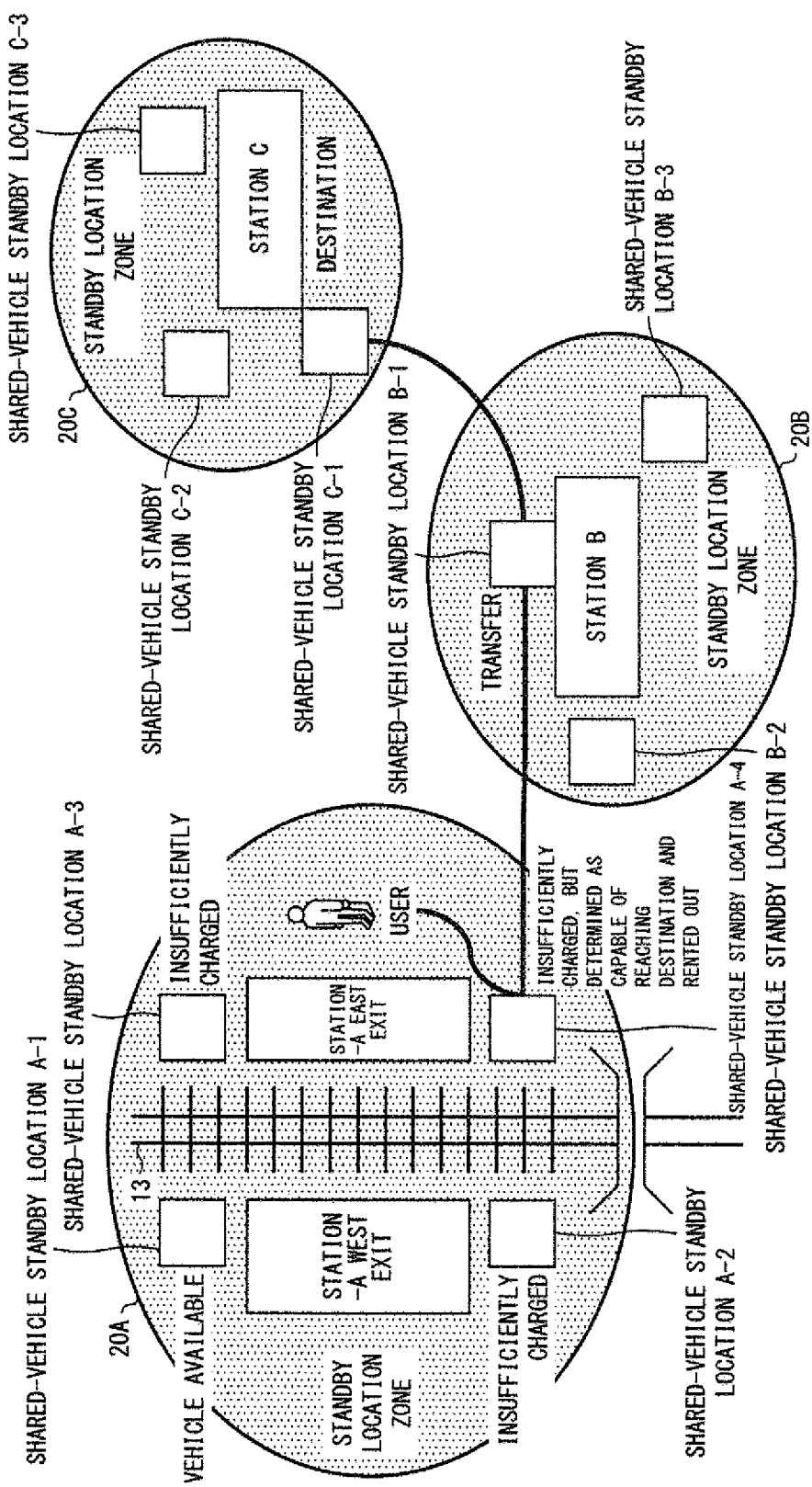
FIG. 3 is a diagram illustrating an example situation in which a user uses a bicycle sharing system in accordance with an embodiment of the present embodiment to travel with use of a motor-assisted bicycle.

Bicycle Sharing System 10 in Accordance with an Aspect of the Present Invention The following description will discuss, with reference to FIG. 3, a specific example of how a user uses the bicycle sharing system 10 in accordance with the present embodiment. FIG. 3 is a diagram illustrating an example situation in which a user uses the bicycle sharing system 10 in accordance with the present embodiment to travel with use of a motor-assisted bicycle 3. For convenience of explanation, FIG. 3 shows shared-vehicle standby locations i-j (where i=A, B, C; and j=1, 2, 3, 4) to discriminate between different shared-vehicle standby locations 2.

The description below assumes the following situation: As illustrated in FIG. 3, there are shared-vehicle standby locations A-1 to A-4 near Station A 11. A user uses a motor-assisted bicycle 3 to leave Station A 11 (starting place) for Station C 21 (destination). There is Station B 31 on a route from Station A 11 to Station C 21. There is a railroad track 13 extending through Station A 11 and sandwiched between a Station-A east exit 11*a* and a Station-A west exit lib. There are shared-vehicle standby locations B1 to B3 near Station B 31 and shared-vehicle standby locations C1 to C3 near Station C 21.

The management server 1 manages, as a standby location zone 20A, a region with a predetermined area around Station A 11 which region covers the shared-vehicle standby location A-1, the shared-vehicle standby location A-2, the shared-vehicle standby location A-3, and the shared-vehicle standby location A-4. The predetermined area may be set as appropriate and stored in the management server 1. Similarly, the management server 1 manages, as a standby location zone 20B, a region around Station B 31 which region covers the shared-vehicle standby location B-1, the shared-vehicle standby location B-2, and the shared-vehicle standby location B-3, and also manages, as a standby location zone 20C, a region around Station C 21 which region covers the shared-vehicle standby location C-1, the shared-vehicle standby location C-2, and the shared-vehicle standby location C-3.

In a case where the user near the Station-A east exit 11a has requested a use reservation with use of the portable terminal 4, the management server 1 specifies a shared-vehicle standby location as a rental location among the shared-vehicle standby locations A-1 to A-4 in the standby location zone 20A. The management server 1 specifies a rental location by carrying out the following operation (details described later): The management server 1 selects a rental location with reference to the standby location zone 20A, which covers the starting place, as well as the occupancy of each shared-vehicle standby location selectable as a junction location and the remaining battery power of each motor-assisted bicycle 3 on standby in the standby location zone 20B. The management server 1 selects a rental location on the basis of an algorithm that the business operator can set as appropriate. In other words, the management server 1 may select a rental location by any of various methods (algorithms) to prevent a particular shared-vehicle standby location 2 from being used excessively. How the management server 1 selects a rental location is not limited to any particular method.

As a specific example, the management server 1 is configured to, in a case where a motor-assisted bicycle(s) 3 that can reach the destination is on standby at that one of the shared-vehicle standby locations A-1 to A-4 which has the highest occupancy, select that shared-vehicle standby location 2 as a rental location. The management server 1 is further configured to select, from among motor-assisted bicycles 3 at the rental location each of which can reach the destination, that one of the motor-assisted bicycles 3 as a rental bicycle which has as small a remaining battery power as possible.

The management server 1 may be configured to select a rental bicycle on the additional condition that a motor-assisted bicycle 3 as a rental bicycle has a remaining battery power of not lower than a predetermined threshold (for example, not less than 20%). This further reduces the possibility of a particular motor-assisted bicycle 3 being overused.

The example illustrated in FIG. 3 assumes that in the standby location zone 20A, the shared-vehicle standby location A-4 has the highest occupancy. The example also assumes that the shared-vehicle standby location A-4 has a motor-assisted bicycle 3 on standby that has a remaining battery power not enough to travel continuously to Station C 21 as the destination.

The management server 1 searches for the possibility of changing motor-assisted bicycles 3 at a junction location when determining whether the user will be able to arrive at the destination with use of the motor-assisted bicycle 3 having an insufficient remaining battery power. Specifically, the management server 1, in this case, extracts patterns (combinations) each of which allows the user to arrive at the destination by changing motor-assisted bicycles 3 at any of the shared-vehicle standby locations B1 to B3 in the standby location zone 20B, and selects an appropriate one from among the combinations extracted. This selection may be based on a determination criterion (algorithm) that the business operator can set as appropriate. The criterion is thus not limited to any particular one. The following description will discuss an example.

The management server 1 extracts, from among the shared-vehicle standby locations B1 to B3, a shared-vehicle standby location(s) at which a motor-assisted bicycle(s) 3 is on standby that has a remaining battery power necessary to arrive at the destination, and selects, from among the shared-vehicle standby locations extracted, a shared-vehicle standby location at which a motor-assisted bicycle 3 is on standby that has as small a remaining battery power as possible. The management server 1 selects that one of the shared-vehicle standby locations C1 to C3 in the standby location zone 20C (which covers the destination) which has the lowest occupancy.

In this example, the management server 1 selects a pattern of changing motor-assisted bicycles 3 at the shared-vehicle standby location B-1 and returning the transfer bicycle at the shared-vehicle standby location C-1, and notifies the user of information on the rental location, the rental bicycle, the junction location, the transfer bicycle, and the return location. The management server 1 may alternatively be configured to select a junction location, notify the user of the junction location, and when the user operates the location management device 201 at the junction location, specifies a transfer bicycle.

The user uses a motor-assisted bicycle(s) 3 on the basis of the above information. This prevents a particular shared-vehicle standby location 2 from being used excessively and levels the respective occupancies of the shared-vehicle standby locations 2. Further, the above configuration allows a motor-assisted bicycle 3 to be rented out with the possibility of the user changing motor-assisted bicycles 3. This allows the user to rent out a motor-assisted bicycle 3 at a shared-vehicle standby location 12d relatively near the destination, and prevents a situation in which the battery of the motor-assisted bicycle 3 runs out before the user reaches the destination. This in turn improves the convenience of the user.

The above configuration allows different motor-assisted bicycles 3 in the bicycle sharing system 10 to be used with similar frequencies, thereby preventing the battery and the like of a particular motor-assisted bicycle 3 from being worn out early.

The description above has outlined the bicycle sharing system 10 in accordance with an aspect of the present invention which bicycle sharing system 10 includes the management server 1. The following description will detail the bicycle sharing system 10 with reference to FIGS. 1 and 4 to 7.

Shared-Vehicle Standby Location 2

Figure 4:
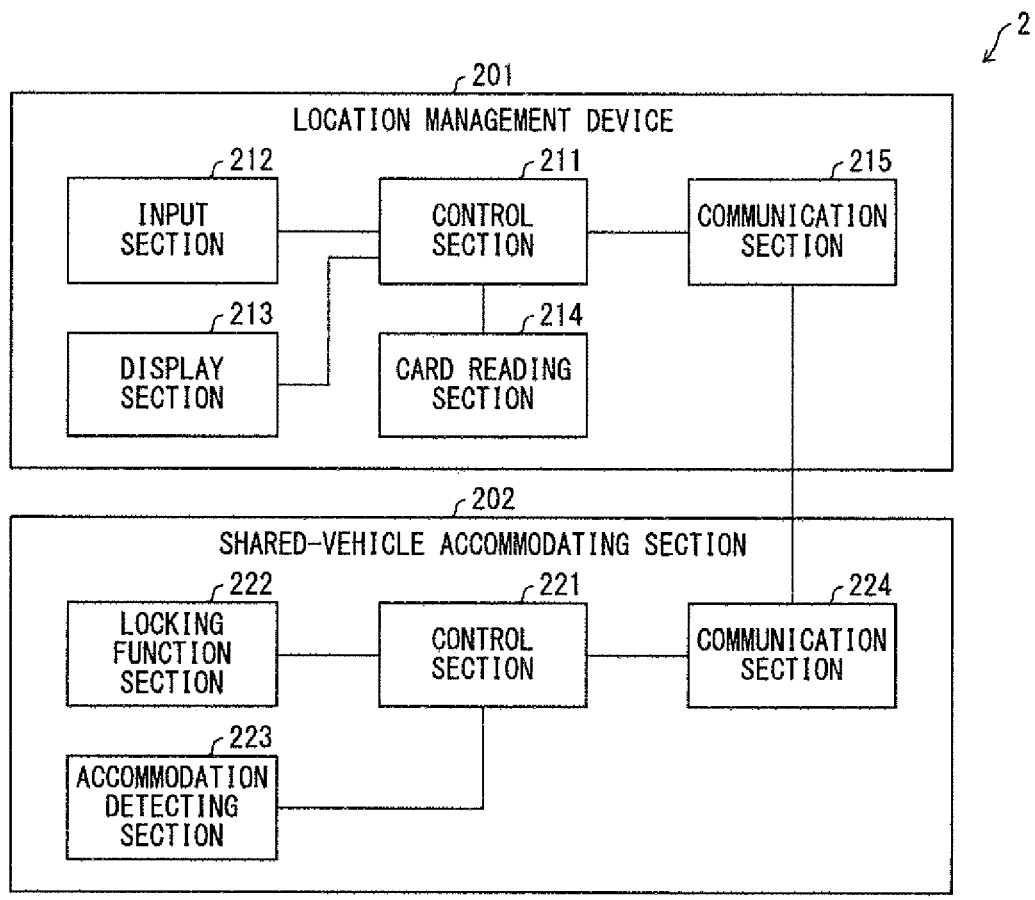
FIG. 4 is a block diagram illustrating how a main part of each shared-vehicle standby location of an embodiment of the present embodiment is configured.

The following description will discuss, with reference to FIG. 4, how each shared-vehicle standby location 2 of the present embodiment is configured. FIG. 4 is a block diagram illustrating how a main part of each shared-vehicle standby location 2 of the present embodiment is configured.

As illustrated in FIG. 4, each shared-vehicle standby location 2 includes a location management device 201 and shared-vehicle accommodating sections 202. Each shared-vehicle standby location 2 includes a plurality of shared-vehicle accommodating sections 202, each of which is capable of accommodating a motor-assisted bicycle 3 (not shown for simplified illustration).

The shared-vehicle standby locations 2 are not particularly limited to any specific form of facility. A shared-vehicle standby location 2 may be, for example, a dedicated bicycle parking space for the bicycle sharing system 10, an open space near a store building, or a roadside space, or may be included in an existing bicycle parking lot.

The location management device 201 is a terminal device installed at a shared-vehicle standby location 2, and is connected communicably to the plurality of shared-vehicle accommodating sections 202 included in the shared-vehicle standby location 2. The location management device 201 may be shaped similarly to a paying machine typically installed at, for example, a coin-operated parking lot. The location management device 201 may alternatively be a terminal including a touch panel embedded in, for example, a building wall for saving space.

A shared-vehicle accommodating section 202 is a piece of equipment that allows the user to park a motor-assisted bicycle 3, and is typically called a bicycle port, a bicycle rack, or a docking port. Each shared-vehicle accommodating section 202 has the function described later. The shared-vehicle accommodating sections 202 are not limited in terms of a specific form. The shared-vehicle accommodating sections 202 simply need to have a function necessary for the bicycle sharing system 10.

Location Management Device 201

The location management device 201 includes a control section 211, an input section 212, a display section 213, a card reading section 214, and a communication section 215. The location management device 201 further includes a storage section (not shown) for storing various items of information.

The control section 211 includes (i) an arithmetic processing section (not shown) such as a central processing unit (CPU) or a dedicated processor and (ii) a memory component (not shown) such as a read-only memory (ROM) or a hard disc drive (HDD). The control section 211 reads out, from the memory component, various pieces of information and programs for various types of control, and executes those programs. The control section of each device described later in the present specification is configured similarly unless otherwise specified. The control section 211 centrally controls individual members included in the location management device 201.

The input section 212 includes, for example, a keyboard, a numeric keypad, a touch panel, or a combination thereof. The input section 212 is not limited in terms of a specific form.

The display section 213 is, for example, a liquid crystal display. When a user uses the location management device 201 to request a use reservation, the display section 213 displays a screen for requesting a use reservation. In a case where the location management device 201 is used as a paying machine as well, the display section 213 displays fee information. In this case, the user inserts a coin or a bill into a money inserting section (not shown).

The card reading section 214 is, for example, a card reader having the function of reading, for example, a credit card or loyalty card that the user owns. The card reading section 214 may have an insertion opening for inserting any of various cards, or may have the function of reading information from a card that the user has brought near the card reading section 214. The user can use a credit card for payment of a rental fee or user authentication (searching its member ID database for the member ID). The user can alternatively use, for example, another IC card for user authentication.

The communication section 215 is connected communicably to the communication section of each shared-vehicle accommodating section 202 and is also connected communicably to the management server 1 over the communication network 5. The communication section 215 may have the function of near-field radio communication such as NFC with the portable terminal 4.

In a case where the user has registered information on a credit card when registering for membership, the user can enter the member ID with use of the input section 212 to pay a rental fee by the credit card registered. The location management device 201 does not necessarily have the function as a paying machine, and does not necessarily include a card reading section 214.

The location management device 201 may alternatively omit the input section 212 and the display section 213. In this case, the location management device 201 may be configured to carry out user authentication with use of the card reading section 214 or communicate with the portable terminal 4 to use the screen of the portable terminal 4 in place of the display section 213.

Shared-Vehicle Accommodating Section 202

Each shared-vehicle accommodating section 202 includes a control section 221, a locking function section 222, an accommodation detecting section 223, and a communication section 224. Each shared-vehicle accommodating section 202 is discriminated from the other shared-vehicle accommodating sections 202 with use of, for example, a unique ID. The description below uses the term "port number" as well to refer to such an ID unique to a shared-vehicle accommodating section 202. The bicycle sharing system 10 of the present embodiment specifies a rental bicycle and a transfer bicycle with use of at least either a bicycle ID or a port number.

The control section 221 centrally controls individual members included in the shared-vehicle accommodating section 202. A shared-vehicle accommodating section 202 may omit the control section 221 so as to be controlled by the control section 211 of the corresponding location management device 201 through the communication section 215 and the communication section 224.

The locking function section 222 locks a wheel of a motor-assisted bicycle 3 by fixing the wheel with use of, for example, a slide bar to prevent a user from taking out the motor-assisted bicycle 3 without permission. The lock of the locking function section 222 may be unlocked by any method (key management system), and may be unlocked with use of a known system. The present embodiment is configured such that the management server 1 generates a four-digit code number (one-time password) as an unlocking code and notifies the user of the code number. The management server stores the one-time password in association with the member ID of the user's and the bicycle ID of the rental bicycle or the port number, and transmits those items of information to the communication section 215 of the location management device 201. When the user enters the user ID and the received one-time password with use of the input section 212 of the location management device 201, the communication section 215 transmits the above items of information to the communication section 224, and the control section 221 unlocks the locking function section 222 corresponding to the bicycle ID or port number.

The present embodiment may be configured such that in a case where the user wants to park and temporarily lock a motor-assisted bicycle 3 during the use of the motor-assisted bicycle 3, the user uses the one-time password to open and close the electronic lock.

The accommodation detecting section 223 detects whether a motor-assisted bicycle 3 is accommodated in the shared-vehicle accommodating section 202 and also detects the remaining battery power of the motor-assisted bicycle 3 accommodated. The accommodation detecting section 223 preferably has the function of charging the battery 302 of the motor-assisted bicycle 3. Specifically how the battery 302 is charged is not limited to any particular method. The accommodation detecting section 223 may include non-contact charging equipment or may include an electric contact or a cord with which the accommodation detecting section 223 is capable of connecting to the battery 302 in such a manner as to be capable of charging the battery 302. The battery 302 may be charged by not the accommodation detecting section 223 but a separate charging section (not shown). The battery 302 may be detached from the motor-assisted bicycle 3 so as to be placed in a lockable charging space.

Each accommodation detecting section 223 transmits, to the management server 1 over the communication network 5, information on (i) whether a motor-assisted bicycle 3 is accommodated and (ii) the remaining battery power detected of the motor-assisted bicycle 3. This transmission of the information may alternatively be carried out by the bicycle-mounted terminal 301 of the motor-assisted bicycle 3.

The communication section 224 is connected communicably to the communication section 215. The communication section 224 may be configured to be capable of, for example, near-field radio communication with the portable terminal 4 that the user owns. The present embodiment may be configured as follows: The application software on the portable terminal 4 that the user owns stores the one-time password. The user looks for and finds a rental bicycle. The user then brings the portable terminal 4 near the communication section 224 of the shared-vehicle accommodating section 202 (rental port) in which the rental bicycle is accommodated. This unlocks the locking function section 222.

Motor-Assisted Bicycle 3

Figure 5:
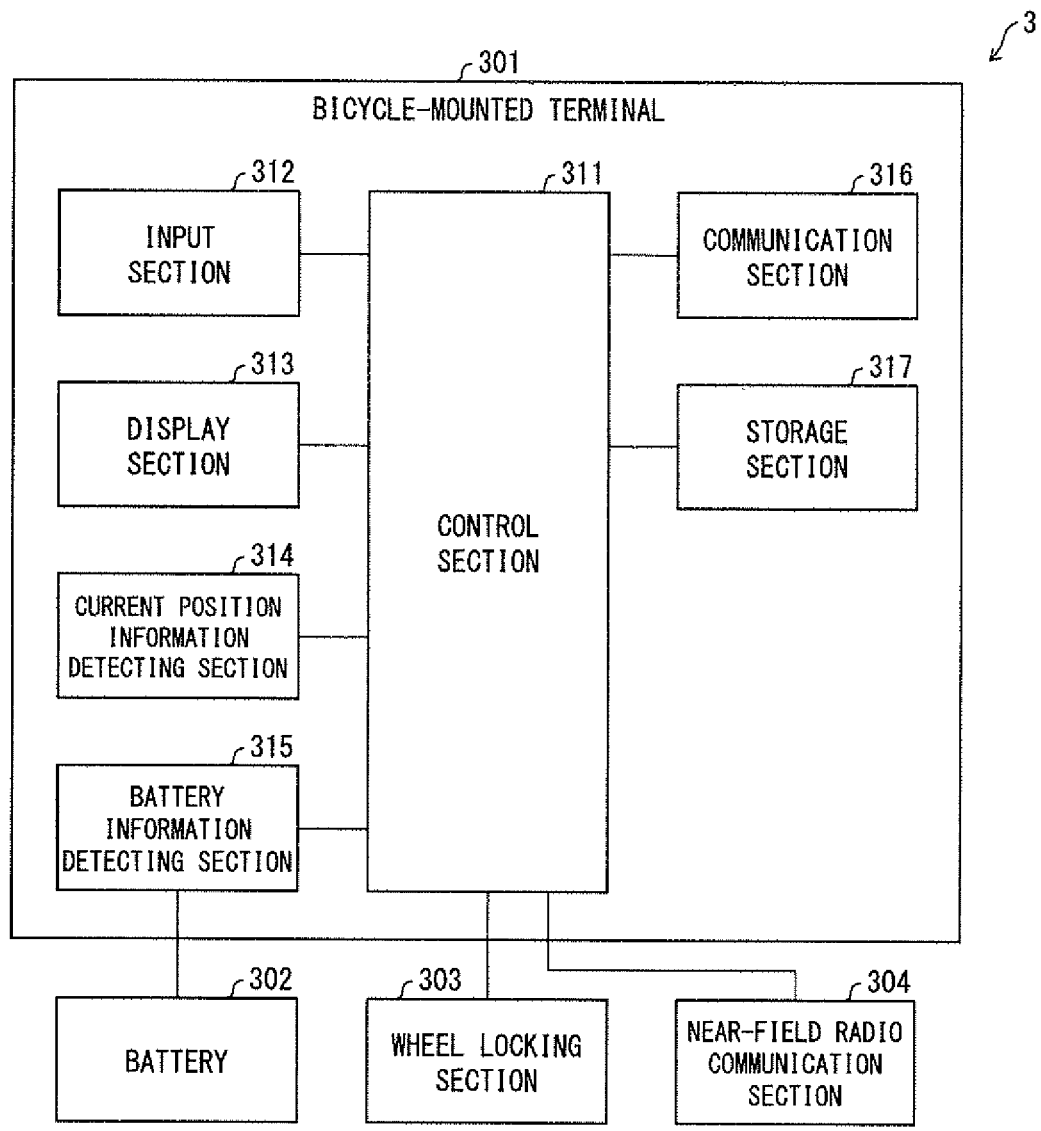
FIG. 5 is a block diagram illustrating how a main part of each motor-assisted bicycle of an embodiment of the present embodiment is configured.

The following description will discuss, with reference to FIG. 5, how each motor-assisted bicycle 3 of the present embodiment is configured. FIG. 5 is a block diagram illustrating how a main part of each motor-assisted bicycle 3 of the present embodiment is configured.

As illustrated in FIG. 5, each motor-assisted bicycle 3 includes a bicycle-mounted terminal 301, a battery 302, a wheel locking section 303, and a near-field radio communication section 304. Each motor-assisted bicycle 3 is discriminated from the other motor-assisted bicycles 3 with use of a unique bicycle ID. Each motor-assisted bicycle 3, for example, has a body provided with a stamp of the bicycle ID of the motor-assisted bicycle 3.

The battery 302 is not limited to any particular one, and is a lithium-ion battery, for example. The battery 302 is electrically connected to a motor-assisting mechanism section (not shown) and a charging mechanism section (not shown) for charging the battery. The battery 302 is discharged while the motor-assisted bicycle 3 is being used, and is charged with electricity from outside while the motor-assisted bicycle 3 is on standby.

The wheel locking section 303 is a mechanical or electric lock that is closed when the user temporarily parks the motor-assisted bicycle 3 during the use of the motor-assisted bicycle 3. The present embodiment may be configured, for instance, such that the wheel locking section 303 is controlled by the bicycle-mounted terminal 301 and that entering a one-time password into the bicycle-mounted terminal 301 opens the wheel locking section 303. The present embodiment may alternatively be configured such that bringing the portable terminal 4 near the near-field radio communication section 304 and operating application software on the portable terminal 4 opens and closes the wheel locking section 303.

The near-field radio communication section 304 carries out near-field radio communication with a shared-vehicle accommodating section 202 or portable terminal 4. Example standards of such near-field radio communication include FeliCa (registered trademark), Mifare (registered trademark), and Near-Field Communication (NFC).

The near-field radio communication section 304 may be based on a technology as such Bluetooth (registered trademark) and iBeacon (registered trademark). Using a technology that allows the position of the user to be detected also allows the wheel locking section 303 to be opened in a case where the user has approached the motor-assisted bicycle 3 and closed in a case where the user has moved apart from the motor-assisted bicycle 3.

Bicycle-Mounted Terminal 301

Each bicycle-mounted terminal (vehicle-mounted terminal) 301 includes a control section 311, an input section (input accepting section) 312, a display section 313, a current position information detecting section (position information obtaining section) 314, a battery information detecting section (battery information obtaining section) 315, a communication section (transmitting section) 316, and a storage section 317. Each bicycle-mounted terminal 301 is a communication terminal capable of communicating with the management server 1, and is a tablet computer, for example. Each bicycle-mounted terminal 301 is, for instance, attached to a portion of the motor-assisted bicycle 3 which portion is near the handlebar, and displays various items of information on a monitor to provide the user with information.

The control section 311 centrally controls individual members included in the bicycle-mounted terminal 301.

The input section 312 is a touch panel, for example. The display section 313 is, for example, a liquid crystal display or an organic EL display. The display section 313 displays various items of information for the user while the user is using the motor-assisted bicycle 3. The display section 313 displays, for example, information on the remaining battery power at the current time point. The display section 313 can also display a map of an area around the current position and navigate the user to the destination and/or via-place desired by the user. The input section 312 and the display section 313 may be combined as a display/input terminal in a housing separate from the bicycle-mounted terminal 301. Specifically, the display/input terminal and the bicycle-mounted terminal 301 may be connected to each other in a wired or wireless manner.

The current position information detecting section 314 uses a positioning system such as the Global Positioning System (GPS), and obtains information on the geographical position of the motor-assisted bicycle 3. The current position information detecting section 314 may be configured to use any of various technologies such as Wi-Fi (registered trademark) positioning and cell positioning (that is, positioning based on positional information from a mobile telephone base station).

The battery information detecting section 315 is electrically connected to the battery 302 to detect the remaining power of the battery 302. This detection is carried out as appropriate while the user is using the motor-assisted bicycle 3. The battery information detecting section 315, for instance, detects the remaining power of the battery 302 every ten seconds, and transmits information on the remaining battery power to the management server 1 through the communication section 316 and the communication network 5. How frequently the battery information detecting section 315 detects the remaining battery power is not limited to any particular frequency, and may be set as appropriate.

The communication section 316 is connected to the management server 1 in such a manner as to be capable of communicating with the management server 1 over the communication network 5.

The storage section 317 stores various pieces of data used for the bicycle-mounted terminal 301.

Management Server 1

Figure 1:
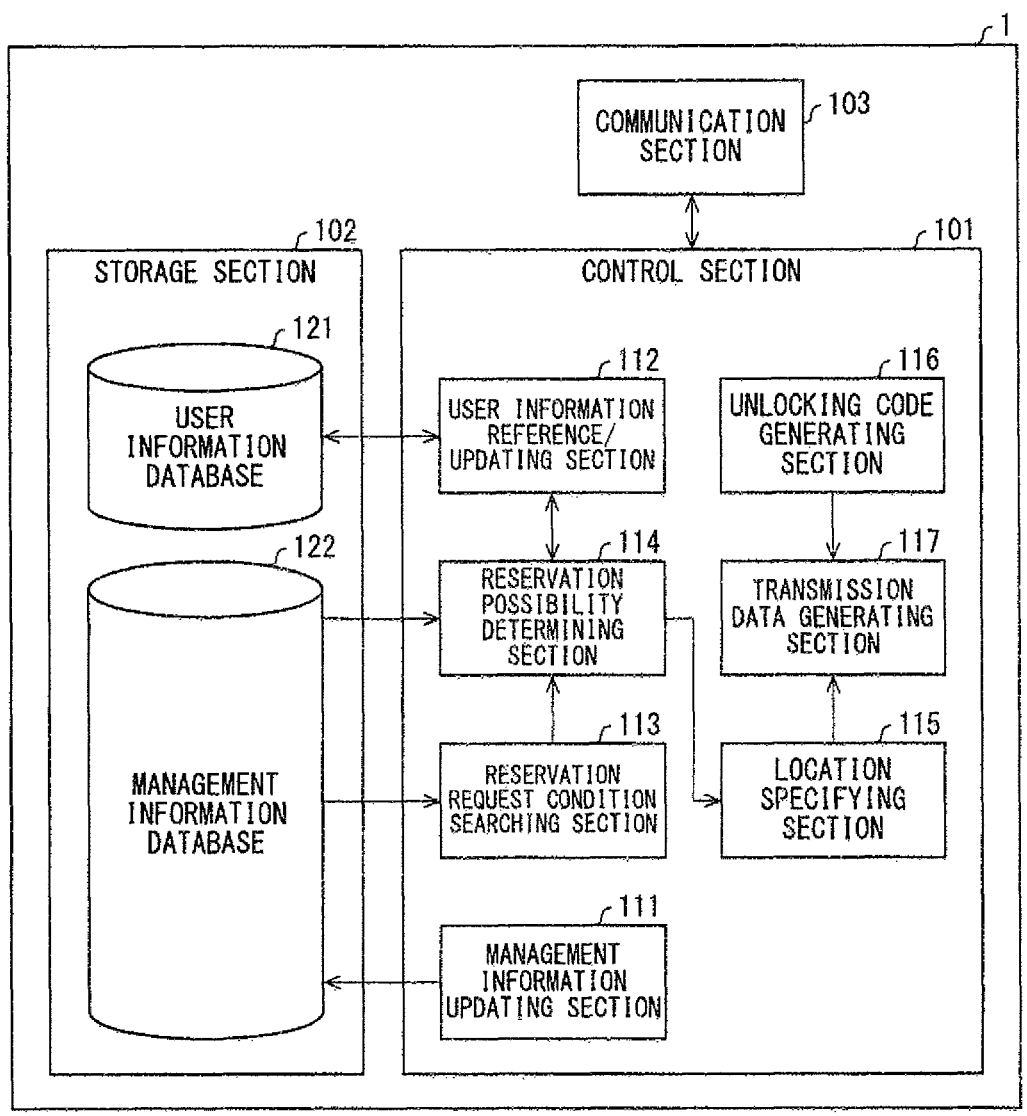
FIG. 1 is a block diagram illustrating how a main part of the management server of an embodiment of the present embodiment is configured.

The following description will discuss, with reference to FIG. 1, how the management server 1 of the present embodiment is configured. FIG. 1 is a block diagram illustrating how a main part of the management server 1 of the present embodiment is configured.

As illustrated in FIG. 1, the management server 1 primarily includes a control section 101, a storage section 102, and a communication section (reservation request receiving section, notifying section) 103. The control section 101 centrally controls individual members included in the management server 1. The storage section 102 stores various pieces of data used for the management server 1. The communication section 103 communicates with individual constituent elements of the bicycle sharing system 10 over the communication network 5.

Control Section 101

The control section 101 includes a management information updating section 111, a user information reference/updating section 112, a reservation request condition searching section (location specifying section) 113, a reservation possibility determining section (location specifying section) 114, a location specifying section 115, an unlocking code generating section 116, and a transmission data generating section 117.

The user information reference/updating section 112, the reservation request condition searching section 113, the reservation possibility determining section 114, and the location specifying section 115 of the control section 101 will be described later in detail together with a description of a flow of a service that the bicycle sharing system 10 provides.

The management information updating section 111 updates a management information database 122 on the basis of various items of information that the communication section 103 has received. The management information updating section 111 updates the management information database 122 on the basis of information that the communication section 103 has received which information is on, for example, (i) each motor-assisted bicycle 3 on standby at each shared-vehicle standby location and/or (ii) each motor-assisted bicycle 3 that a user is using.

The unlocking code generating section 116 generates an unlocking code for unlocking the locking function section 222 of a shared-vehicle accommodating section 202. The unlocking code generating section 116, for instance, generates a one-time password and transmits the one-time password to the transmission data generating section 117.

The transmission data generating section 117 generates transmission data including (i) information on the rental location that the location specifying section 115 has specified and (ii) an unlocking code that the unlocking code generating section 116 has generated, and transmits the transmission data to the communication section 103. The communication section 103 transmits the transmission data to the portable terminal 4 of the user's to notify the user of various items of information.

Storage Section 102

The storage section 102 includes a user information database 121 and a management information database 122. The user information database 121 and the management information database 122 may be stored in the storage section 102 in any manner, and may be stored on respective storage mediums separate from each other or on a single storage medium. These databases may be stored on any storage medium(s). The storage medium(s) may be selected as appropriate according to the type of data to be stored.

The user information database 121 stores membership information of each user. The user information database 121 is updated and referred to by the user information reference/updating section 112. The user information database 121 stores, in association with the member ID of each user, the following information related to the user: (i) the address, (ii) the name, (iii) a telephone number, (iv) an email address, (v) the age, and (iv) an account for fee payment (for example, a credit card number). The information stored in the user information database 121 is not limited to the above. The user information database 121 may further store, for example, the history of use of the bicycle sharing system 10 by the user.

The management information database 122 stores information that is received through the communication section 103 and the communication network 5 and that is on each shared-vehicle standby location 2 and each motor-assisted bicycle 3 included in the bicycle sharing system 10. The management information database 122 is updated as appropriate by the management information updating section 111. Specifically, the management information database 122 stores information such as the following: At the current time point, (i) at which shared-vehicle standby location 2 each motor-assisted bicycle 3 is on standby, (ii) whether each motor-assisted bicycle 3 is being used by a user, (iii) whether each motor-assisted bicycle 3 is reserved, and (iv) how much remaining battery power each motor-assisted bicycle 3 has. The management information database 122 also stores information on the occupancy of each shared-vehicle standby location 2 at the current time point. The management information database 122 has also registered information on the position of each shared-vehicle standby location 2. Referring to the management information database 122 makes it possible to calculate how much remaining battery power is necessary to travel between different locations. The calculation of how much remaining battery power is necessary to travel between different locations may factor in, for example, a slope on the road between different shared-vehicle standby locations 2.

The management information database 122 also stores various items of information used in a case where the user selects a via-place (such as the name of each via-place candidate, the position of each via-place candidate, and the average length of stay at each via-place candidate).

The following description will discuss, with reference to FIG. 6, an example of an information management table, which shows a portion of reservation management information stored in the management information database 122. FIG. 6 is an example of an information management table stored in the management information database 122.

As illustrated in FIG. 6, the management information database 122 stores the following information for each motor-assisted bicycle 3 identified with use of a bicycle ID: information on the rental location or standby location and each motor-assisted bicycle 3 that has been rented out or reserved (namely, the bicycle ID and the port number). The management information database 122 allows each shared-vehicle standby location to be discriminated from the other shared-vehicle standby locations with use of a location ID set for the location for management. The management information database 122 allows each user who has rented out or reserved a motor-assisted bicycle 3 to be identified with use of a member ID. The information management table stores a rental date and time, a return date and time, a rental flag indicative of whether the motor-assisted bicycle 3 has been rented out, and a planned return location ID.

Portable Terminal 4

Figure 7:
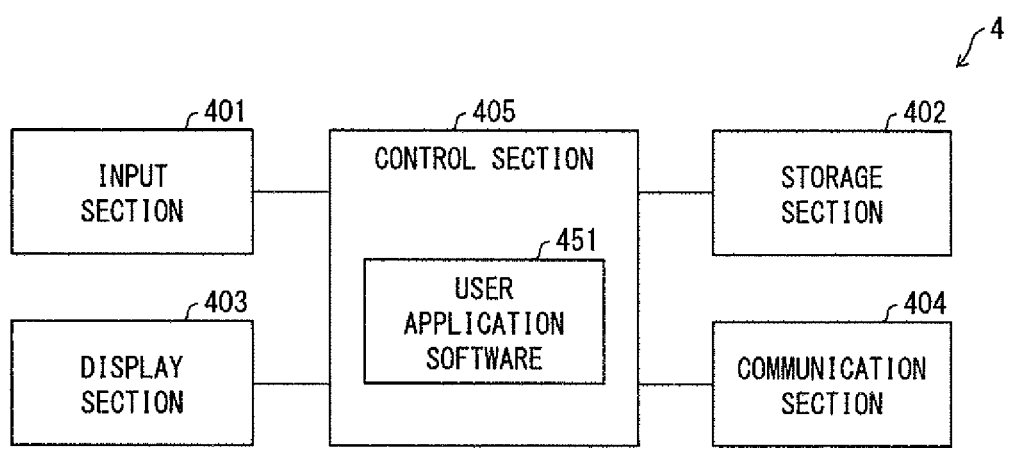
FIG. 7 is a block diagram illustrating how a main part of a portable terminal of an embodiment of the present embodiment is configured.

FIG. 7 is a block diagram illustrating how a main part of the portable terminal 4 of the present embodiment is configured. As illustrated, the portable terminal 4 includes an input section 401, a storage section 402, a display section 403, a communication section 404, and a control section 405.

The input section 401 accepts an input operation by the user. The storage section 402 stores, for example, various pieces of data and application programs executed by the control section 405. The display section 403 is a display device for displaying various images. The display section 403 displays, for example, (i) a screen of the reservation management website of which screen data has been transmitted from the communication section 103 of the management server 1 or (ii) user application software 451 executed by the control section 405. The communication section 404 communicates with individual devices included in the bicycle sharing system 10.

The control section 405 centrally controls individual sections of the portable terminal 4. The control section 405 also reads out application programs from the storage section 402 and executes the user application software 451. The user can use the user application software 451 to perform various operations such as requesting of a use reservation, membership authentication, and key management.

The portable terminal 4 further includes a current position information obtaining section (not shown). The current position information obtaining section uses a positioning system such as the GPS.

Service Flow

Figure 8:
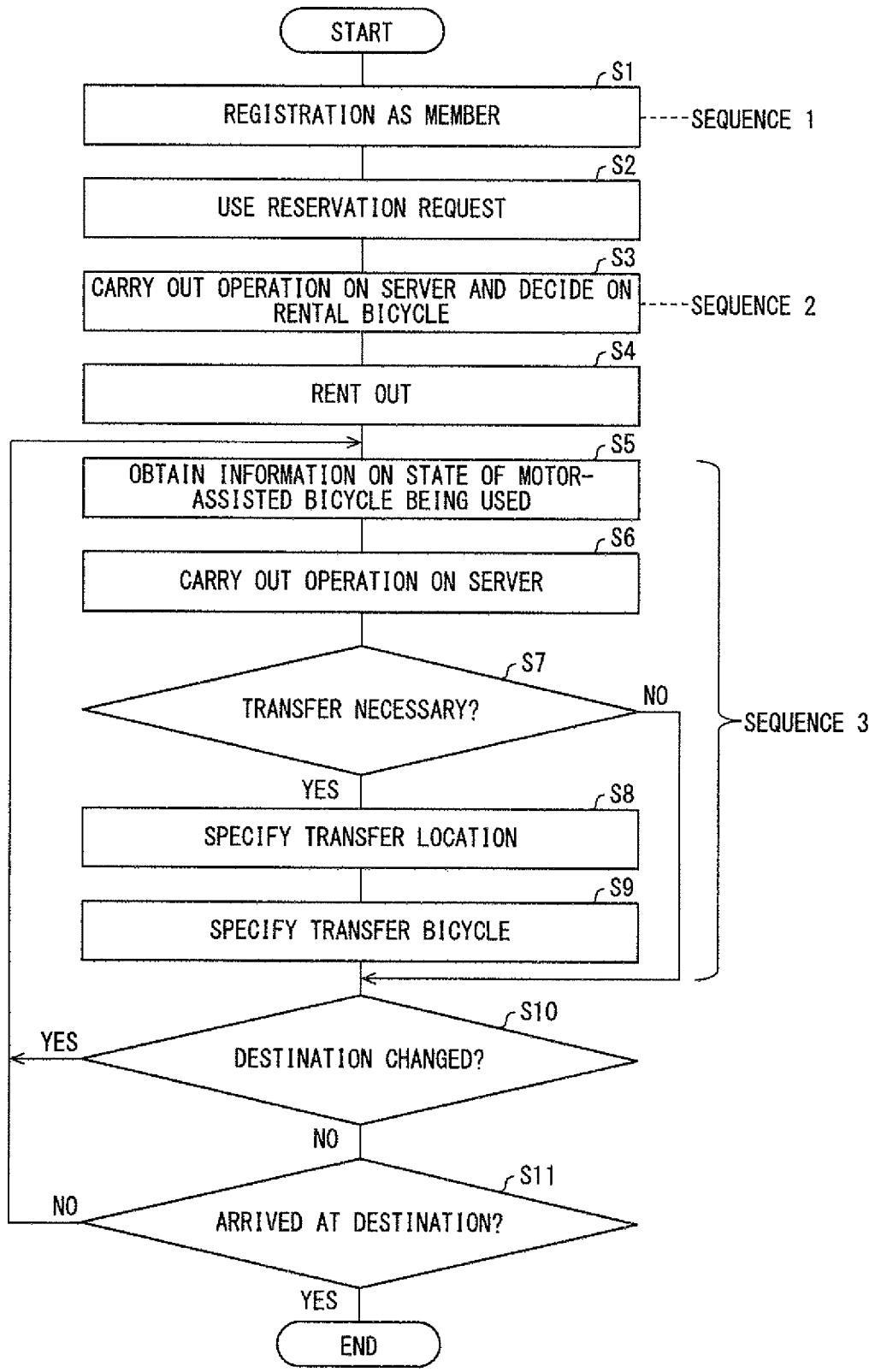
FIG. 8 is a flowchart illustrating a flow of a service of rental of a motor-assisted bicycle which service a bicycle sharing system of an embodiment of the present embodiment provides.

The following description will discuss, with reference to FIGS. 8 to 18, a flow of a service of rental of a motor-assisted bicycle 3 which service the bicycle sharing system 10 of the present embodiment provides. FIG. 8 is a flowchart illustrating a flow of a service of rental of a motor-assisted bicycle 3 which service the bicycle sharing system 10 of the present embodiment provides.

The description below deals with a case in which a user uses the service of the bicycle sharing system 10 for the first time. In a case where a user has used the service before, the user does not need to undergo the step of registering for membership. The user, in this case, first logs in on the reservation management website with use of a member ID or transmits desired reservation information together with a member ID.

To facilitate understanding of a flow of the service that the bicycle sharing system 10 of the present embodiment provides, the description below first deals with a service flow for a case in which the user does not select a via-place.

Membership Registration

As illustrated in FIG. 8, the user first registers user information (membership registration) (Step 1; hereinafter abbreviated as "S1").

Figure 9:
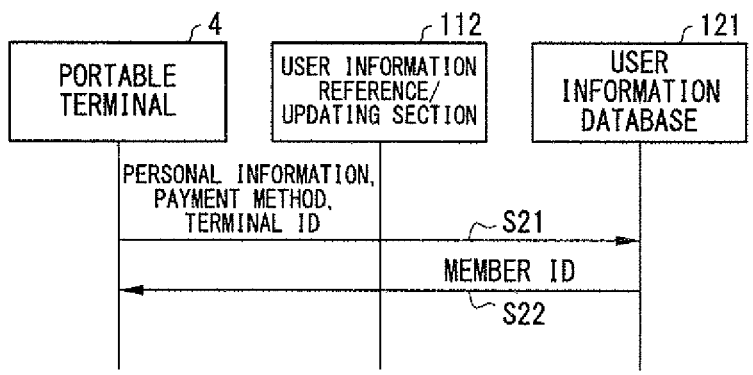
FIG. 9 is a sequence diagram schematically illustrating how a portable terminal and a management server each operate when a user uses the portable terminal to register as a member.

FIG. 9 is a sequence diagram schematically illustrating how the portable terminal 4 (as a terminal device operated by the user) and the management server 1 each operate when the user uses the portable terminal 4 to register as a member.

The user may alternatively use a terminal device such as a location management device 201 and a personal computer for membership registration. The user may further alternatively use the user application software 451, which is executed by the control section 405 of the portable terminal 4.

As illustrated in FIG. 9, the user operates the input section 401 of the portable terminal 4 to access the reservation management website, and enters (i) personal information such as the name and the address and (ii) information on a payment method such as credit card information. The communication section 404 transmits, to the management server 1 as membership registration request information, the information entered and the terminal ID unique to the portable terminal 4. The communication section 103 of the management server 1 receives the membership registration request information, and transmits the membership registration request information to the user information reference/updating section 112. The user information reference/updating section 112 accesses the user information database 121 to update the user information database 121 in such a manner as to store the membership registration request information and a new member ID in association with each other (S21).

The communication section 103 then transmits, to the communication section 404 of the portable terminal 4 over the communication network 5, information on the member ID assigned to the user who has requested to register as a member. The display section 403 displays the information (S22). This ends the registration of the user as a member. The user recognizes the member ID assigned.

Selecting a rental location and a rental bicycle After S1 above, the user requests a reservation for use of a motor-assisted bicycle 3. Specifically, the user operates the input section 401 of the portable terminal 4 to enter (i) the member ID, (ii) starting-place information (that is, information on a desired starting place), (iii) destination information (that is, information on a desired destination), (iv) a desired date and time of starting the use, and (v) a desired date and time of ending the use. The communication section 404 of the portable terminal 4 transmits the entered information to the management server 1 over the communication network 5 to request a use reservation (S2).

The starting-place information may be information on the current position. In other words, the user may request a use reservation with the current position as a starting place with use of information on the current position which information is stored in the portable terminal 4. The present embodiment may be configured such that (i) the reservation management website provides a screen that displays a plurality of standby location zones 20 of which information is stored in the management information database 122 and that (ii) the user selects that standby location zone 20 which covers the starting place. The starting-place information may be, in other words, information on that standby location zone 20 in which the user wants to start. The present embodiment may alternatively be configured such that (i) the user enters, for example, an address or the name of a distinctive construction on the reservation management website, that (ii) the control section 101 of the management server causes the reservation management website to display candidates of the standby location zone 20 corresponding to the entered information, and that (iii) the user selects one of the displayed candidates as a starting place.

The destination information may be the address of the destination or the name of a distinctive construction, train station, sightseeing spot or the like as the destination. The present embodiment may be configured such that (i) the reservation management website provides a screen that displays a plurality of standby location zones 20 of which information is stored in the management information database 122 and that (ii) the user selects that standby location zone 20 which covers the destination.

The management server 1 carries out an arithmetic process (details described later) on the basis of the entered information to decide on a rental location and a rental bicycle (S3). The management server 1 transmits, to the user, information on the rental location and rental bicycle that the management server 1 has decided on. The management server 1 transmits, to the user together with the above information, an unlocking code (for example, a one-time password) generated by the unlocking code generating section 116. The user goes to the shared-vehicle standby location 2 as the rental location, and enters the member ID and the one-time password into the input section 212 of the location management device 201. This opens the locking function section 222 of the shared-vehicle accommodating section 202 (rental port) in which the rental bicycle is accommodated, thereby allowing the user to rent out a motor-assisted bicycle 3 (S4).

Figure 10:
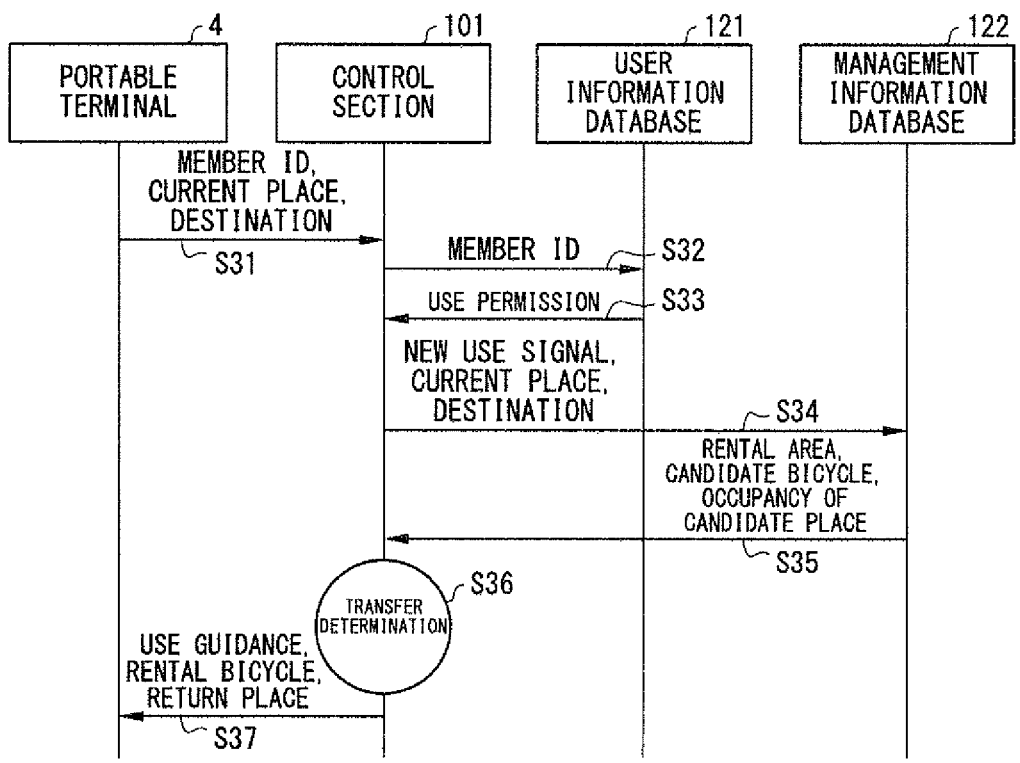
FIG. 10 is a sequence diagram schematically illustrating how a portable terminal and a management server each operate when the management server carries out a process of deciding on a rental location and a rental bicycle.

The following description will discuss, with reference to FIG. 10, a flow of how the management server 1 carries out an arithmetic process in S3 above to decide on a rental location and a rental bicycle on the basis of a request for a use reservation from the user. FIG. 10 is a sequence diagram schematically illustrating how the portable terminal 4 and the management server 1 each operate when the management server 1 carries out a process of deciding on a rental location and a rental bicycle. The description below deals with a case in which the starting-place information is information on the current position of the user. The process flow is similar for a case where the user selects (enters) starting-place information. The management server 1 may carry out an arithmetic process to decide on a rental location and a rental bicycle on the basis of various items of information when the user has requested a use reservation. This makes it possible to produce the effect of the present invention of preventing a particular shared-vehicle standby location 2 from being used excessively, as with the case described below.

As illustrated in FIG. 10, the user operates the input section 401 of the portable terminal 4 to access the reservation management website. The user then enters the member ID and a desired destination, and selects to use the current position of the user as a desired starting place. The communication section 404 transmits the entered information to the management server 1 (S31). The user may alternatively use the user application software 451 (which is executed by the control section 405) for the above operations. The description here basically omits discussion of information on a desired date and time of starting the use and a desired date and time of ending the use, as such information is not so relevant to the arithmetic process by the management server 1.

First, the user information reference/updating section 112 of the control section 101 of the management server 1 accesses the user information database 121 to search the user information database 121 for the member ID received (S32). If the user information reference/updating section 112 has found the member ID in the user information database 121, the user information reference/updating section 112 transmits, to the reservation possibility determining section 114, information to the effect that the user can use (reserve) a motor-assisted bicycle 3 (S33).

After S33 or during a process of S32 and S33, the reservation request condition searching section 113 of the control section 101 accesses the management information database 122 together with a new use signal (S34), and obtains, on the basis of the current-place information and the destination information, information such as information on (i) that standby location zone 20 (rental area) which covers the current place of the user, (ii) the occupancy of each shared-vehicle standby location 2 as a candidate for a rental location, and (iii) each motor-assisted bicycle 3 on standby at the shared-vehicle standby location 2 as a candidate for a rental location (standby state information) (S35).

The control section 101, on the basis of the information obtained, carries out an arithmetic process of transfer determination (details described later) (S36). The reservation request condition searching section 113 searches for any candidate for a combination of shared-vehicle standby locations 2 which combination satisfies the use conditions entered by the user (that is, a combination of a rental location, a transfer location, and a return location that the user can use who will use a motor-assisted bicycle(s) 3 capable of arriving at the destination with the possibility of changing motor-assisted bicycles 3). If the reservation request condition searching section 113 has found such a combination(s), the reservation request condition searching section 113 transmits, to the reservation possibility determining section 114, information to the effect that the user can use (reserve) a motor-assisted bicycle 3. The reservation possibility determining section 114 transmits, to the location specifying section 115, information to the effect that the user can use (reserve) a motor-assisted bicycle 3.

The location specifying section 115 refers to the management information database 122 to specify a rental location and a return location among the combinations that the reservation request condition searching section 113 has retrieved (extracted). The location specifying section 115 also specifies a rental bicycle. If the result of the transfer determination indicates that the user will need to change motor-assisted bicycles 3, the location specifying section 115 also specifies a transfer location.

The transmission data generating section 117 generates transmission data including data on (i) each location specified and (ii) an unlocking code generated by the unlocking code generating section 116. The communication section 103 transmits the transmission data to the user (notifies the user of the transmission data) together with a use guidance (S37).

Algorithm Through which the Location Specifying Section Specifies a Location

The location specifying section 115 selects (specifies) a rental location and a return location on the basis of a determination criterion by a determination method which criterion and method are not particularly limited as long as the criterion and method prevent a particular rental location from being used excessively. The following description will discuss specific examples (i) to (iii).

(i) For instance, the location specifying section 115 selects, as a rental location, that one of two or more shared-vehicle standby locations 2 near the starting place desired by the user which has the highest occupancy. The location specifying section 115 then (i) selects, one by one as a rental bicycle candidate, motor-assisted bicycles 3 on standby at the rental location in order of increasing remaining battery power, (ii) determines whether the user will need to change motor-assisted bicycles 3 as described later, and (iii) specifies, as a rental bicycle, a motor-assisted bicycle 3 that is capable of arriving at the destination. This prevents a particular shared-vehicle standby location 2 from being used excessively.

The location specifying section 115 may be configured such that in (i) above, in a case where, for instance, the user has requested a use reservation with use of current-position information as starting-place information, the location specifying section 115 selects a rental location from among two or more shared-vehicle standby locations 2 near the user (that is, in a standby location zone 20 near the user) while factoring in the distance from the current position of the user. Specifically, the location specifying section 115 may be configured such that in a case where, for instance, (i) that shared-vehicle standby location 2 which is the closest to the current position of the user has the second highest occupancy in the standby location zone 20, and (ii) that shared-vehicle standby location 2 which has the highest occupancy is relatively far from the current position of the user, the location specifying section 115 selects, as a rental location, that shared-vehicle standby location 2 which is the closest to the current position of the user. Such determination may be carried out by, for instance, weighting various conditions (for example, converting various conditions into numerical values) and making a comprehensive judgement on the various conditions (for example, comparing the totals of the numerical values with one another). This further improves the convenience of the user.

(iii) The location specifying section 115 may be configured such that in (i) or (ii) above, the location specifying section 115 selects a rental bicycle candidate from among motor-assisted bicycles 3 each having a remaining battery power of not lower than a predetermined threshold. The present embodiment may be configured such that (i) the management information database 122 stores information on the history of use of each motor-assisted bicycle 3 and that (ii) the location specifying section 115 specifies a rental bicycle with reference to that information. This allows different motor-assisted bicycles 3 to be used with leveled frequencies, thereby preventing the battery and the like of a motor-assisted bicycle 3 from being worn out early.

The present embodiment is configured such that the location specifying section 115 of the management server 1 decides on a rental bicycle. The present embodiment may, however, be modified such that the location specifying section 115 specifies a rental location, but does not specify a rental bicycle. This modified example may be configured such that when the user has entered the member ID and a one-time password into the location management device 201 at a rental location of which the user has been notified, the location management device 201 specifies, among those motor-assisted bicycles 3 on standby at the shared-vehicle standby location 2 at which the location management device 201 is installed, a suitable motor-assisted bicycle 3 to be rented out for the user.

Transfer Determination

Figure 11:
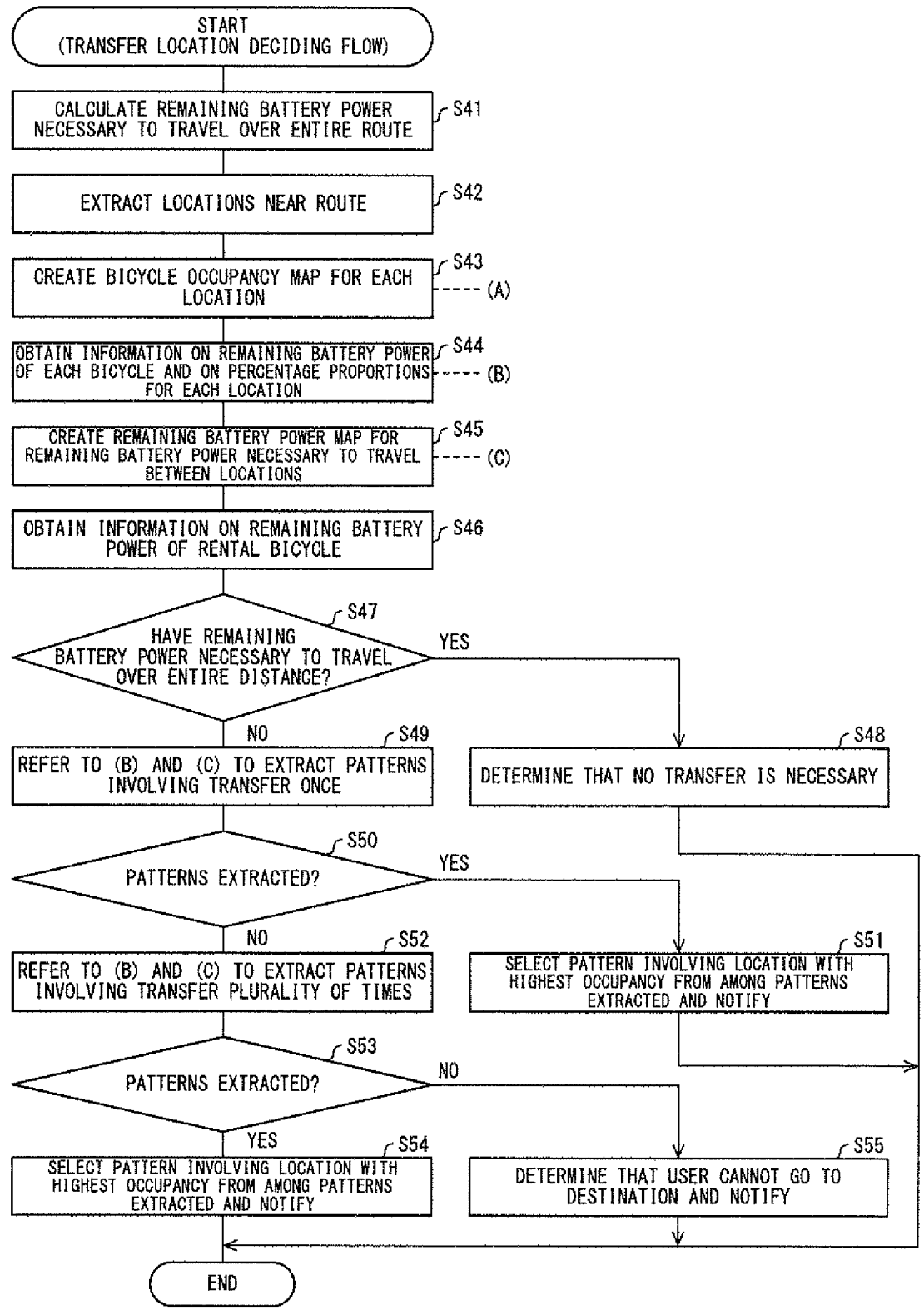
FIG. 11 is a flowchart illustrating a flow of how a location specifying section carries out transfer determination.

The following description will discuss, with reference to FIGS. 11 to 14, the above-mentioned transfer determination (S36). FIG. 11 is a flowchart illustrating a flow of how the control section 101 carries out transfer determination. FIG. 12 is a table that shows the respective occupancies of shared-vehicle standby locations 2 as transfer location candidates. FIG. 13 is a table that classifies, into ten different classes according to the remaining battery power, each motor-assisted bicycle 3 on standby at each shared-vehicle standby location 2 as a transfer location candidate to show the percentage of motor-assisted bicycles 3 in each class of the remaining battery power. FIG. 14 is a table that shows the remaining battery power necessary to travel between different shared-vehicle standby locations.

As illustrated in FIG. 11, the reservation request condition searching section 113 refers to the management information database 122 to calculate the remaining battery power necessary for a motor-assisted bicycle 3 to travel over the entire distance from the starting place to the destination (S41). This example assumes that a motor-assisted bicycle 3 will need 80%.

The reservation request condition searching section 113 refers to the management information database 122 to extract a shared-vehicle standby location(s) 2 near the route from the starting place to the destination (S42). The reservation request condition searching section 113 then obtains information on the occupancy of each shared-vehicle standby location 2 extracted (hereinafter referred to as "transfer location candidate") (S43). FIG. 12 shows a bicycle occupancy map in the form of a table to facilitate understanding of the occupancy of each transfer location candidate.

The reservation request condition searching section 113 further refers to the management information database 122 to (i) obtain information on the remaining battery power of each motor-assisted bicycle 3 on standby at each transfer location candidate, (ii) calculate the percentage proportions for each transfer location candidate, and (iii) create a bicycle remaining battery power map that shows the calculation results (S44). In this example, the bicycle remaining battery power map is in the form of a table that (i) classifies motor-assisted bicycles 3 at each transfer location candidate into ten different classes according to the remaining battery power and that (ii) shows the percentage of motor-assisted bicycles 3 in each class of the remaining battery power. FIG. 13 shows an example bicycle remaining battery power map.

The reservation request condition searching section 113 further refers to the management information database 122 to obtain information on the remaining battery power necessary to travel between different locations and create a required remaining battery power map in the form of a table that shows each remaining battery power necessary (S45). FIG. 14 shows an example required remaining battery power map. During this step, the reservation request condition searching section 113 tentatively specifies a rental location and a return location to obtain information on the remaining battery power necessary to travel between different locations. The reservation request condition searching section 113 may tentatively specify a rental location and a return location by any method, and may, for instance, select a location with a high occupancy as a rental location and a location with a low occupancy as a return location.

The maps in FIGS. 12 to 14 each show information in the management information database 122 in such a visual manner as to facilitate understanding. The reservation request condition searching section 113 simply needs to obtain information on various items of information (such as the occupancies, the remaining battery power of each motor-assisted bicycle 3, and the remaining battery power necessary to travel between different locations), and does not need to create the above maps. The management information database 122 may store various items of information shown in the above maps. In this case, the management information updating section 111 updates those items of information as appropriate.

After S45, the reservation request condition searching section 113 tentatively (i) specifies a rental bicycle among those motor-assisted bicycles 3 on standby at the tentatively specified rental location and (ii) obtains information on the remaining battery power of the tentatively specified rental bicycle (S46). The reservation request condition searching section 113 then determines on the basis of the remaining battery power whether the tentatively specified rental bicycle is capable of traveling over the entire distance from the starting place to the destination. The reservation request condition searching section 113, in other words, determines whether the tentatively specified rental bicycle has a remaining battery power (in this case, 80%) necessary to travel over the entire distance (S47). The reservation request condition searching section 113 may tentatively specify a rental bicycle by, for example, selecting, from among those motor-assisted bicycles 3 at the tentatively specified rental location, that motor-assisted bicycle 3 which has the highest remaining battery power. Alternatively, the reservation request condition searching section 113 may tentatively specify a rental bicycle by, for example, (i) selecting one of those motor-assisted bicycles 3 classified as belonging in the class with the highest proportion in the bicycle remaining battery power map or (ii) selecting, from among those motor-assisted bicycles 3 at the tentatively specified rental location, that motor-assisted bicycle 3 which is used with the lowest frequency.

If the tentatively specified rental bicycle has a remaining battery power necessary to travel over the entire distance (YES in S47), the reservation request condition searching section 113 determines that the user will not need to change motor-assisted bicycles 3. This ends the flow (S48).

If the tentatively specified rental bicycle does not have a remaining battery power necessary to travel over the entire distance (NO in S47), the reservation request condition searching section 113 refers to the bicycle remaining battery power map in S44 and the required remaining battery power map in S45 to extract, on the basis of transfer location candidates, a combination(s) (pattern(s)) that involves a transfer once (S49). Specifically, the reservation request condition searching section 113 extracts a transfer location candidate(s) that the tentatively specified rental bicycle is capable of reaching with use of the remaining battery power if starting at the rental location. In a case where any of those motor-assisted bicycles 3 on standby at the extracted transfer location candidate has a remaining battery power that allows the motor-assisted bicycle 3 to travel over the entire distance from the transfer location candidate at which the motor-assisted bicycle 3 is on standby to the return location, the reservation request condition searching section 113 extracts that combination as a pattern that involves a transfer once.

If the reservation request condition searching section 113 has extracted a pattern(s) that involves a transfer once (YES in S50), the reservation request condition searching section 113 selects that one of the patterns extracted which incorporates a transfer location candidate having the highest occupancy. The reservation request condition searching section 113 then transmits information on the selected pattern to the location specifying section 115 (S51).

If the reservation request condition searching section 113 has not extracted a pattern that involves a transfer once (NO in S50), the reservation request condition searching section 113 refers again to the bicycle remaining battery power map in S44 and the required remaining battery power map in S45 to extract a pattern(s) that involves a transfer a plurality of times (S52).

If the reservation request condition searching section 113 has extracted a pattern(s) that involves a transfer a plurality of times (YES in S53), the reservation request condition searching section 113 selects that one of the patterns extracted which incorporates a combination of transfer location candidates each having the highest occupancy. The reservation request condition searching section 113 then transmits information on the selected pattern to the location specifying section 115 (S54).

The reservation request condition searching section 113 has not extracted a pattern(s) that involves a transfer a plurality of times (NO in S53), the reservation request condition searching section 113 determines that the user will be unable to reach the destination (S55).

The reservation request condition searching section 113 carries out transfer determination such as the above while tentatively specifying different rental locations and return locations to extract two or more patterns. If the reservation request condition searching section 113 has extracted a pattern(s), the reservation possibility determining section 114 determines that the user can reserve a motor-assisted bicycle 3, and transmits information on the extracted pattern(s) to the location specifying section 115.

The location specifying section 115 specifies a suitable rental location, a suitable transfer location, a suitable rental bicycle, and a suitable transfer bicycle with reference to the pattern(s) extracted by the reservation request condition searching section 113.

The location specifying section 115 specifies a transfer location, but does not specify a transfer bicycle. This example may be configured such that when the user has entered necessary information (such as the member ID) into the location management device 201 at the transfer location of which the user has been notified, the location management device 201 specifies, among those motor-assisted bicycles 3 on standby at the shared-vehicle standby location 2 at which the location management device 201 is installed, a suitable motor-assisted bicycle 3 for a transfer by the user.

Transfer Guidance During Use

The following description will discuss, with reference to FIG. 8 again, a process carried out after S4 for transfer guidance during use of a motor-assisted bicycle 3 by the user.

While the user is using a motor-assisted bicycle 3, the location specifying section 115 refers to the management information database 122 to obtain information on the state (the remaining battery power and current position) of the motor-assisted bicycle 3 that the user is using (S5).

The location specifying section 115 carries out an arithmetic process on the basis of the above information (S6) and determines whether the user will need to change motor-assisted bicycles 3 (S7).

If the location specifying section 115 has determined that the user will need to change motor-assisted bicycles 3 (for instance, as a result of the user taking a detour or using extra time for a reason, the battery 302 has been decreasing more quickly than originally expected, and the location specifying section 115 has determined that the remaining battery power has been reduced further than a level necessary to travel over the entire distance to the destination) (YES in S7), the location specifying section 115 specifies a transfer location (S8). The location specifying section 115 further specifies a transfer bicycle (S9). A later description will detail, with reference to FIG. 16, how the location specifying section 115 specifies a transfer location as such while the user is using a motor-assisted bicycle 3.

If the location specifying section 115 has determined that the user will not need to change motor-assisted bicycles 3 (NO in S7), the user continues to use the motor-assisted bicycle 3 that the user is using.

In a case where the user has operated the bicycle-mounted terminal 301 to change the destination (made a destination change request) (YES in S10), the process repeats S5 and the subsequent steps.

In a case where the user does not change the destination (NO in S10), the process repeats S5 and the subsequent steps if the user has not arrived at the destination (return location) (NO in S11). In a case where the user has arrived at the destination (return location) (YES in S11), the user returns the motor-assisted bicycle 3. This ends the process by the bicycle sharing system 10.

Transfer Determination During Use

Figure 15:
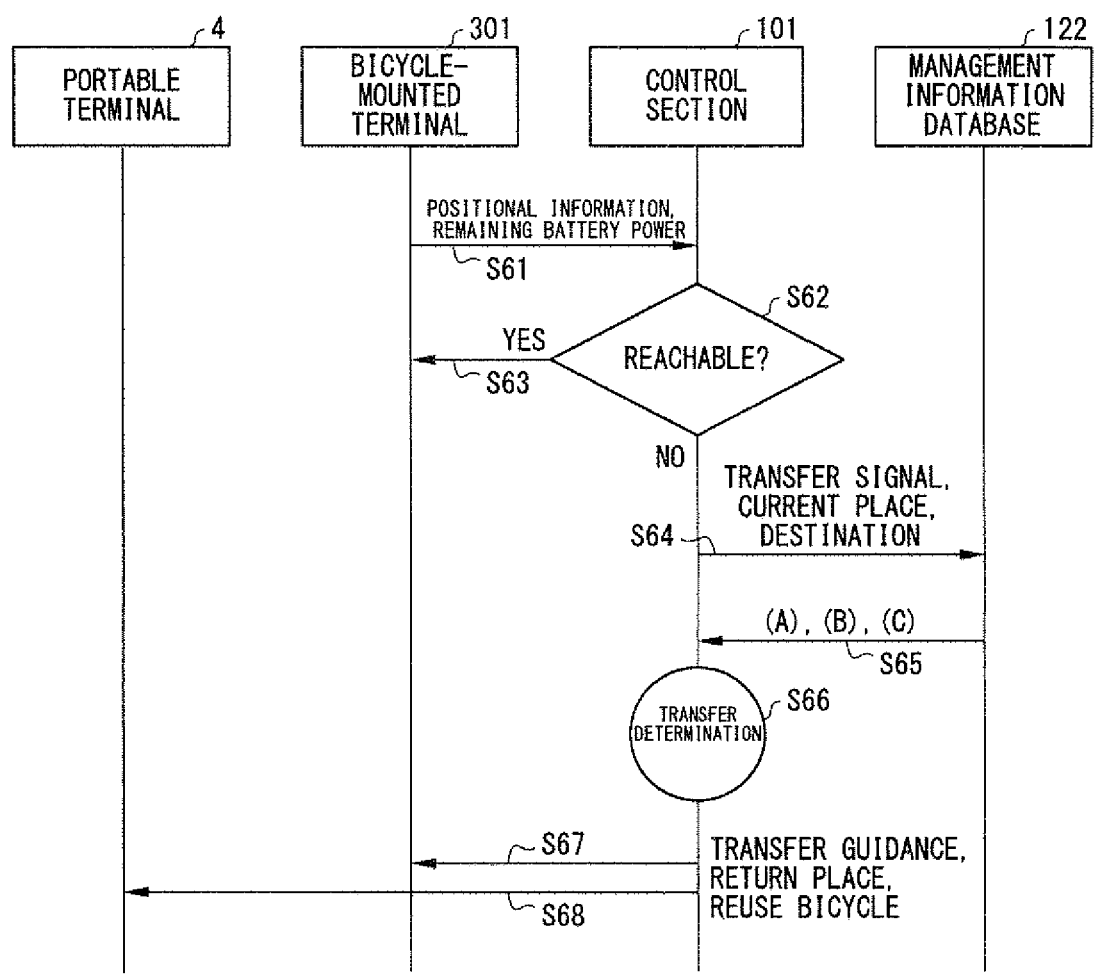
FIG. 15 is a sequence diagram schematically illustrating how a bicycle-mounted terminal, a management server, and a portable terminal each operate for a process of transfer guidance carried out during use of a motor-assisted bicycle by a user.
Figure 16:
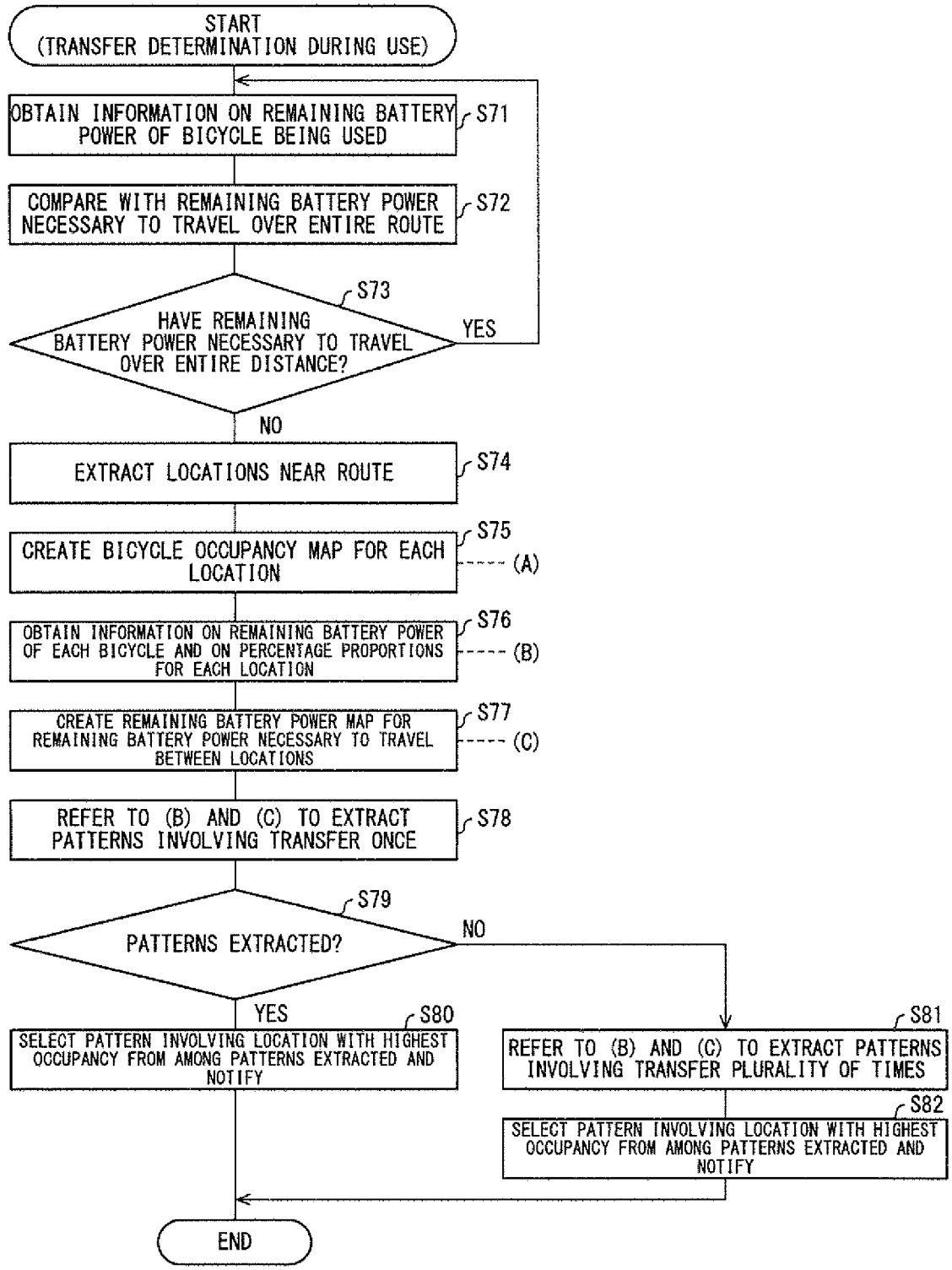
FIG. 16 is a flowchart illustrating a flow of how a location specifying section carries out transfer determination during use of a motor-assisted bicycle by a user.

The following description will discuss, with reference to FIGS. 15 and 16, transfer determination carried out by the location specifying section 115 from S5 to S9 in FIG. 8 during use of a motor-assisted bicycle 3 by the user. FIG. 15 is a sequence diagram schematically illustrating how the bicycle-mounted terminal 301, the management server 1, and the portable terminal 4 each operate for a process of transfer guidance carried out during use of a motor-assisted bicycle 3 by the user. FIG. 16 is a flowchart illustrating a flow of how the location specifying section 115 carries out transfer determination during use of a motor-assisted bicycle 3 by the user.

As illustrated in FIG. 15, the communication section 316 of the bicycle-mounted terminal 301 transmits, to the management server 1, (i) information on the remaining power of the battery 302 which remaining power has been detected by the battery information detecting section 315 and (ii) current-place information that has been detected by the current position information detecting section 314 (S61). The communication section 316 transmits the above items of information to the management serve 1 every ten seconds, for example. The information thus transmitted is received by the communication section 103 of the management server 1. The management information updating section 111 updates the management information database 122 accordingly.

The location specifying section 115 refers to the management information database 122 to determine whether the motor-assisted bicycle 3 is capable of traveling over the entire distance to the destination (S62). If the motor-assisted bicycle 3 is capable of traveling over the entire distance to the destination (YES in S62), the communication section 103 of the management server 1 may (i) transmit, to the bicycle-mounted terminal 301, information to the effect that the user can continue to use the motor-assisted bicycle 3 or (ii) transmit no information to the bicycle-mounted terminal 301 and repeat S61 and S62 (S63).

If the motor-assisted bicycle 3 is incapable of traveling over the entire distance to the destination (NO in S62), the location specifying section 115 accesses the management information database 122 together with a transfer signal to extract a shared-vehicle standby location(s) 2 along the route from the current position to the return location on the basis of the current-position information and the destination information (S64). The location specifying section 115 then obtains information on a bicycle occupancy map (see FIG. 12), a bicycle remaining battery power map (see FIG. 13), and a required remaining battery power map (see FIG. 14) (S65), and carries out transfer determination on the basis of those items of information (S66).

The location specifying section 115 then specifies a transfer location and a transfer bicycle. The transmission data generating section 117 then generates transmission data including data on the transfer location and transfer bicycle specified. The communication section 103 transmits transfer guidance and the transmission data to the bicycle-mounted terminal 301 (S67) and to the portable terminal 4 (S68) as well.

The process flow described above with reference to a sequence diagram is described below with reference to a flowchart. As illustrated in FIG. 16, the location specifying section 115 refers to the management information database 122 to obtain information on the remaining battery power of the motor-assisted bicycle 3 that the user is using (S71).

The location specifying section 115 then refers to the management information database 122 to calculate, from (i) the information on the current place of the motor-assisted bicycle 3 that the user is using and (ii) the destination information, the remaining battery power necessary for the motor-assisted bicycle 3 to travel over the entire distance to the destination. The location specifying section 115 then compares the necessary remaining battery power with the remaining battery power on which information has been obtained in S71 (S72).

If the battery 302 of the motor-assisted bicycle 3 that the user is using has a remaining battery power necessary to travel over the entire distance (YES in S73), the process repeats S71 and the subsequent steps.

If the battery 302 of the motor-assisted bicycle 3 that the user is using does not have a remaining battery power necessary to travel over the entire distance (NO in S73), S74 to S77 are carried out, which are similar respectively to S42 to S45 (see FIG. 11).

Then, S78 to S82 are carried out, which are similar respectively to S49 to S53 (see FIG. 11). While S42 to S45 and S49 to S53 described above are carried out for a tentatively specified motor-assisted bicycle 3, S74 to S77 and S78 to S82 are carries out for the motor-assisted bicycle 3 that the user is using.

The user using a motor-assisted bicycle 3 indicates that the location specifying section 115 has determined that the motor-assisted bicycle 3 is capable of traveling from the starting place to the destination and has thus rented out the motor-assisted bicycle 3. This example thus does not take into consideration a pattern that does not allow the user to arrive at the destination even after changing motor-assisted bicycles 3 a plurality of times. In a case of such a pattern, the management server 1 will notify the user of information to the effect of instructing the user to change motor-assisted bicycles 3 at the nearest shared-vehicle standby location 2.

In a case where the user has operated the bicycle-mounted terminal 301 or the portable terminal 4 during use of a motor-assisted bicycle 3 to request to change the destination (destination change request), the management server 1 carries out transfer determination during use on the basis of information on the new destination.

If the user wants to return, somewhere near the current position, the motor-assisted bicycle 3 that the user is using, the user can operate the bicycle-mounted terminal 301 or the portable terminal 4 to transmit information to that effect to the management server 1. In this case, the location specifying section 115 specifies a suitable return location among those shared-vehicle standby locations 2 near the user.

With Via-Place Information

The description above has dealt with a service flow for a case where the user does not enter information on a via-place. The following description will discuss, with reference to FIGS. 17 and 18, a service flow for a case where the user wants a via-place.

Figure 17:
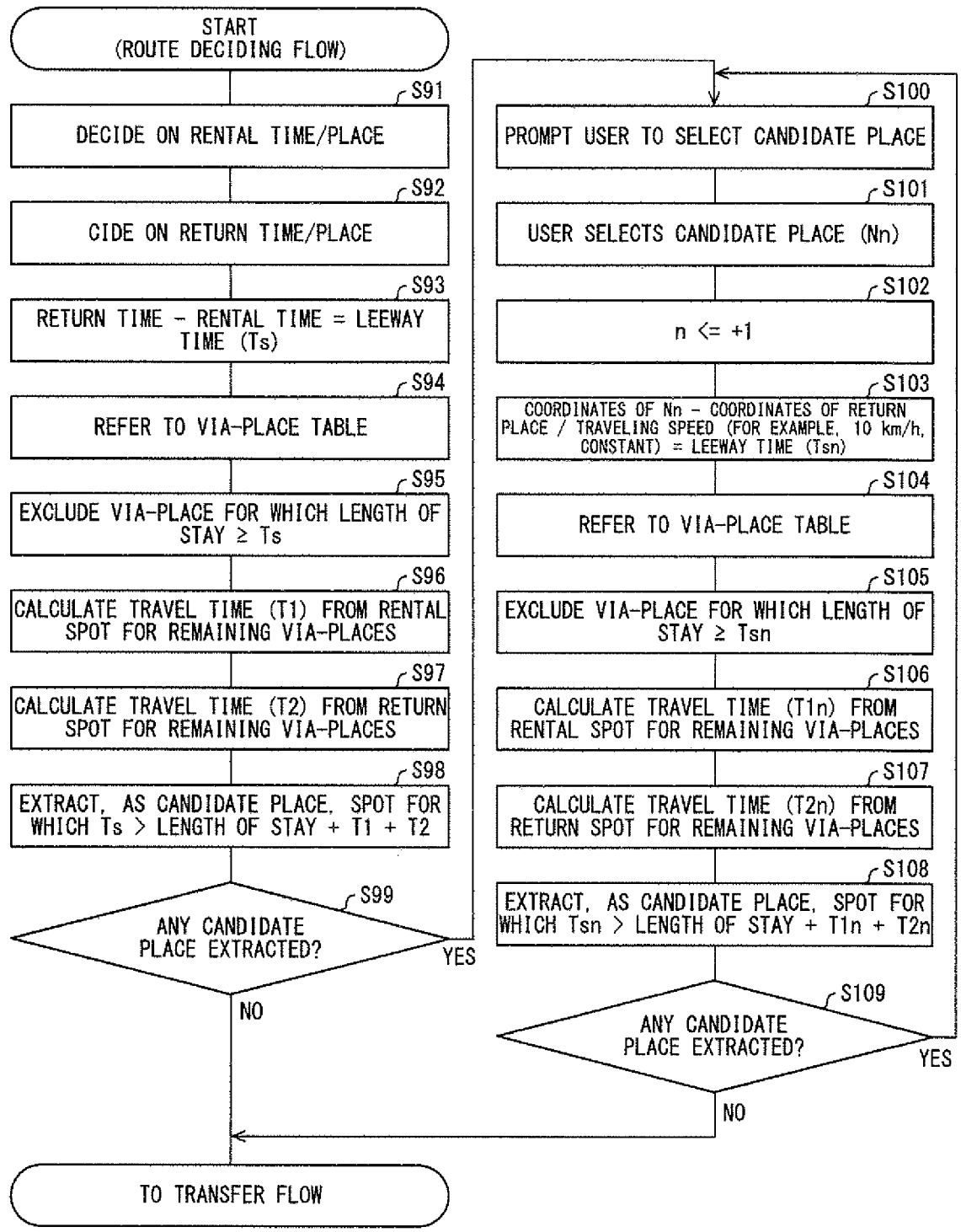
FIG. 17 is a flowchart illustrating a flow of a service of rental of a motor-assisted bicycle which service a bicycle sharing system of an embodiment of the present embodiment provides in a case where a user wants a via-place.

FIG. 17 is a flowchart illustrating a flow of a service of rental of a motor-assisted bicycle 3 which service the bicycle sharing system 10 of the present embodiment provides in the case where the user wants a via-place. FIG. 18 is a table that shows examples of via-place candidates stored in the management information database 122.

As illustrated in FIG. 17, the reservation request condition searching section 113 first, on the basis of (i) starting-place information (that is, information on a desired starting place) and (ii) information on a desired date and time of starting the use (which items of information have been transmitted from, for example, a portable terminal 4 that the user operates), refers to the management information database 122 to decide on a starting spot and a standby location zone 20 covering a starting spot and a rental time (rental time/place) (S91).

The reservation request condition searching section 113 then, on the basis of (i) destination information (that is, information on a desired destination) and (ii) information on a desired date and time of ending the use (which items of information have been transmitted from, for example, a portable terminal 4 that the user operates), refers to the management information database 122 to decide on (i) a destination spot or a standby location zone 20 covering a destination spot and (ii) a return time (return time/place) (S92).

Regarding the decision on a rental place in S91 and the decision on a return place in S92, in a case where the reservation request condition searching section 113 specifies shared-vehicle standby locations 2 as the rental place and the return place, the decision means tentative specification. The rental place and the return place may, for example, be each a standby location zone 20. A plurality of shared-vehicle standby locations 2 included in a standby location zone 20 may be close to one another. Thus, calculation of travel time described later may involve, for example, coordinates of a representative spot in a standby location zone 20.

The rental time and the return time correspond respectively to the planned rental time and the planned return time at the stage at which the user requests a use reservation.

Next, the reservation request condition searching section 113 calculates the difference between the return time and the rental time as a leeway time Ts (S93). The reservation request condition searching section 113 refers to a via-place table stored in the management information database 122 (S94). FIG. 18 shows an example of the via-place table.

As illustrated in FIG. 18, the management information database 122 stores, in the form of a via-place table (stop-spot information), information on the name of each via-place at which the user may stop by (stop spot), the position thereof (coordinates), and the average length of stay (expected length of stay) thereat.

Next, the reservation request condition searching section 113 refers to the via-place table stored in the management information database 122 to exclude any via-place candidate at which the average length of stay is larger than the leeway time Ts above (S95), and extracts the remaining via-place candidate(s).

The reservation request condition searching section 113 then calculates a travel time (T1) from the starting place for each via-place candidate extracted (which was not excluded in S95) (S96). The reservation request condition searching section 113 also calculates a travel time (T2) from the destination for each via-place candidate extracted (S97). The starting place and the destination are a tentatively specified rental location and a tentatively specified return location, respectively.

The reservation request condition searching section 113 extracts, as a candidate place, a spot for which Ts>(average length of stay+T1+T2) (S98). If the reservation request condition searching section 113 has extracted no candidate place (NO in S99), the management server 1 causes the display section 403 of the portable terminal 4 of the user's to display information to that effect. The process thereafter continues similarly to a case where the user did not select a via-place. Specifically, the location specifying section 115 selects a rental location and a rental bicycle as in S3 (see FIG. 8), which is followed by S4 and the subsequent steps.

If the reservation request condition searching section 113 has extracted a candidate place(s) (YES in S99), the management server 1 causes the display section 403 of the portable terminal 4 of the user's to display the candidate place(s), and prompts the user to select a via-place from among the candidate place(s) displayed (S100). The description below uses the symbol "Nn" to refer to the via-place that the user has selected. The "n" has an initial value of 0, and is incremented by 1 every time the user selects a via-place.

When the user selects a via-place (S101), n is incremented by 1 (S102). The via-place that the user has selected first is the first via-place N1.

The reservation request condition searching section 113 calculates the distance from the coordinates of the via-place Nn to the coordinates of the destination spot, and divides the calculated distance by the travel speed (for example, 10 km/h) to calculate the leeway time Tsn (where n=1, 2, 3, . . . ) (S103). This example uses the coordinates of the first via-place N1 to calculate the leeway time Ts1.

The reservation request condition searching section 113 refers to the via-place table stored in the management information database 122 (S104) to exclude any via-place candidate at which the average length of stay is larger than the leeway time Ts1 above (S105), and extracts the remaining via-place candidate(s).

The reservation request condition searching section 113 then calculates a travel time (T1n) from the starting place for each via-place candidate extracted (which was not excluded in S105) (S106). In this example, n=1, so the reservation request condition searching section 113 calculates the travel time (T1).

The reservation request condition searching section 113 also calculates a travel time (T2n) from the destination for each via-place candidate extracted (S107). In this example, n=1, so the reservation request condition searching section 113 calculates the travel time (T21).

The reservation request condition searching section 113 extracts, as a candidate place, a spot for which Tsn>(average length of stay+T1n+T2n). (S108). In this example, n=1, so the reservation request condition searching section 113 extracts, as a candidate place, a spot(s) for which Ts1>(average length of stay+T11+T21). If the reservation request condition searching section 113 has extracted no candidate place (NO in S109), the management server causes the display section 403 of the portable terminal 4 of the user's to display information to that effect.

If the reservation request condition searching section 113 has extracted a candidate place(s) (YES in S109), S100 and the subsequent steps are repeated.

Then, the reservation request condition searching section 113, on the basis of information on the via-place that the user has selected, refers to the management information database 122 to carry out a flow of the above-described transfer determination (see FIG. 11) and thereby extract two or more patterns. If the reservation request condition searching section 113 has extracted a pattern(s), the reservation possibility determining section 114 determines that the user can reserve a motor-assisted bicycle 3, and transmits information on the extracted pattern(s) to the location specifying section 115. The location specifying section 115 specifies a suitable rental location and a rental bicycle with reference to the patterns extracted by the reservation request condition searching section 113. The location specifying section 115 further specifies a transfer location and a transfer bicycle. The location specifying section 115 may, for the above-described transfer determination during use (see FIG. 16), calculate a route with reference to information on the via-place to determine whether the user will need to change motor-assisted bicycles 3.

Specific Use Examples

Example Operation on the Screen of the Portable Terminal

The following description will discuss, with reference to FIGS. 19 and 20, specific examples of screens displayed by the portable terminal 4.

FIG. 19 is a diagram illustrating a specific example of transition of screens displayed on the portable terminal 4 in a case where the user requests a use reservation with use of the portable terminal 4.

In a case where the user has used the portable terminal 4 to access the reservation management website, enter the member ID, and log in to request a use reservation, the display section 403 of the portable terminal 4 displays a use start request condition entry screen P1 (see (a) of FIG. 19).

The use start request condition entry screen P1 displays (i) an area for entering a date and time of starting the use and (ii) a link button for selecting a use start zone. When the user has tapped the area for entering a date and time of starting the use, the display section 403 displays a screen for entering or selecting a date and time of starting the use. When the user has tapped the link button for selecting a use start zone, the display section 403 displays zones A to C (standby location zones 20) on a use start zone selecting screen P2 that prompts the user to select a use start zone (see (b) of FIG. 19).

When the user has selected a desired use start zone on the use start zone selecting screen P2, the display section 403 displays a use end request condition entry screen P3 (see (c) of FIG. 19). The use end request condition entry screen P3 displays (i) an area for entering a date and time of ending the use and (ii) a link button for selecting a use end zone (return zone). When the user has tapped the area for entering a date and time of ending the use, the display section 403 displays a screen for entering or selecting a date and time of ending the use. When the user has tapped the link button for selecting a return zone, the display section 403 displays zones A to C (standby location zones 20) on a return zone selecting screen P4 that prompts the user to select a return zone (see (d) of FIG. 19).

FIG. 20 is a diagram illustrating a specific example of transition of screens displayed on the portable terminal 4 in a case where the user requests a use reservation with use of the portable terminal 4 and selects a via-place.

When the display section 403 has displayed the return zone selecting screen P4, and the user has selected a desired return zone, the display section 403 displays a via-place candidate(s) on a first via-place selecting screen P11 that prompts the user to select a first via-place (see (a) of FIG. 20).

When the user has selected a desired via-place on the first via-place selecting screen P11, the location specifying section 115 carries out an operation on the basis of information on the selected first via-place to extract a second via-place candidate(s) from a via-place table stored in the management information database 122. The display section 403 then displays a second via-place selecting screen P12 that prompts the user to select a second via-place (see (b) of FIG. 20).

When the user has selected, on the second via-place selecting screen P12, a second via-place or a skip button (not shown) to the effect of not selecting a via-place, the display section 403 displays a use guidance notification screen P13 for notifying the user of information on (i) a rental location to be used by the user for rental and (ii) a return location to be used by the user for return (see (c) of FIG. 20).

Example Operation on the Screen of the Bicycle-Mounted Terminal

The following description will discuss, with reference to (a) to (c) of FIG. 21, (i) specific examples of screens displayed by the bicycle-mounted terminal 301 of the motor-assisted bicycle 3 that the user is using and (ii) an example of how the user can operate the bicycle-mounted terminal 301. (a) to (c) of FIG. 21 are diagrams illustrating a specific example of transition of screens displayed by the bicycle-mounted terminal 301 in a case where the user changes the destination and the planned return date and time during use of a motor-assisted bicycle 3.

During use of a motor-assisted bicycle 3, the user performs an operation with use of the input section 312 of the bicycle-mounted terminal 301 mounted on the motor-assisted bicycle 3 to cause the display section 313 to display a return operation screen P21 for a return operation (see (a) of FIG. 21).

When the user has tapped a return operation button displayed on the return operation screen P21, the display section 313 displays a return condition entry screen P22 (see (b) of FIG. 21).

The return condition entry screen P22 displays (i) an area for entering a date and time of ending the use (return time) and (ii) a link button for selecting a use end zone (return zone). When the user has tapped the area for entering a date and time of ending the use, the display section 313 displays a screen for entering or selecting a new date and time of ending the use. When the user has tapped the link button for selecting a return zone, the display section 313 displays zones A to C (standby location zones 20) in a return zone changing screen P23 that prompts the user to select a new return zone (see (c) of FIG. 21).

Specific Example for a Case where the User Travels Via a Via-Place

First, the user accesses the reservation management website with use of the portable terminal 4 and enters the member ID and desired reservation information. The destination below assumes that the user has entered (i) Station AA as the starting place, (ii) 11:00 as the desired date and time of starting the use, (iii) Mount BB as the destination (as a return condition), and (iv) 15:00 on the same date as the desired date and time of ending the use (as a return condition). The description below also assumes that the reservation possibility determining section 114 has determined that the user can reserve a motor-assisted bicycle 3.

The location specifying section 115, on the basis of information in the management information database 122, obtains information on a required travel time (45 minutes) from a shared-vehicle standby location 2 (rental candidate location) near Station AA to a shared-vehicle standby location 2 (return candidate location) near Mount BB. The location specifying section 115 then carries out the following operation to calculate a leeway time: Return time point (15:00)−Rental time point (11:00)−Required travel time (45 minutes)=Leeway time Ts1 (3 hours and 15 minutes)

The location specifying section 115, on the basis of the leeway time Ts1, searches for, among via-place candidates registered in advance in the management information database 122, a via-place candidate(s) that satisfies a return condition within the range of the leeway time. The location specifying section 115 then causes the display section 403 of the portable terminal 4 to display the via-place candidate(s) retrieved.

This example assumes that (i) the display section 403 has displayed via-place candidates such as Museum CC, Temple DD, and Department store EE and that (ii) the user has selected Temple DD. This example also assumes that the expected length of stay at Temple DD is 30 minutes.

In this case, the location specifying section 115 calculates a required time T1A (15 minutes) from the rental candidate location to Temple DD, which the user has selected as a via-place. The location specifying section 115 also calculates a required time T1B (one hour) from Temple DD, which the user has selected as a via-place, to the return candidate location.

The location specifying section 115 calculates, from the desired date and time of starting the use (11:00), an arrival time (11:15) at Temple DD, and further carries out the following operation to calculate a leeway time Ts2: Return time point (15:00)−Arrival time at Temple DD (11:15)−Expected length of stay (30 minutes)−Required travel time T1B (1 hour)=Leeway time Ts2 (2 hours and 15 minutes)

The location specifying section 115, on the basis of the leeway time Ts2, searches for a via-place candidate(s) that the user can reach between Temple DD and Mount BB, and causes the display section 403 of the portable terminal 4 to display the via-place candidate(s).

This example assumes that (i) the display section 403 has displayed via-place candidates such as Temple FF, Temple GG, Temple HH, and Temple II and that (ii) the user has selected Temple GG. The location specifying section 115 carries out an operation on the basis of information on (i) a required time for travel from Temple DD to Temple GG, (ii) a required time for travel from Temple GG to Mount BB, and (iii) an expected length of stay at Temple GG. The location specifying section 115 determines as a result that the user will have no leeway time Ts3, and thus ends causing the display section 403 of the portable terminal 4 to display the via-place candidates.

The location specifying section 115 then specifies a rental location on the basis of not only the management information database 122, the starting-place information, and the destination information, but also information on the via-place that the use has selected. The user rents out a rental bicycle at the rental location. The bicycle-mounted terminal 301 navigates the user to Mount BB as the destination via Temple DD and Temple GG, which the user has selected as via-places.

Specific example of a case where the user changes motor-assisted bicycles 3 before reaching the destination The description below assume that in the specific example above, the rental bicycle has been rented out for the user after the location specifying section 115 has determined that with the rental bicycle, the user will not need to change motor-assisted bicycles 3 before reaching the destination (that is, the rental bicycle has a sufficient remaining battery power).

The bicycle-mounted terminal 301 constantly obtains information on the remaining power of the battery 302 of the motor-assisted bicycle 3 and transmits the information to the management server 1 during the navigation (that is, while the user is using the motor-assisted bicycle 3). The management information updating section 111 of the management server 1 updates the management information database 122 on the basis of the received information on the remaining battery power.

This example assumes that the user has stopped by at Store JJ for shopping on the way from Temple DD as a via-place to Temple GG as the next via-place.

In a case where the location specifying section 115 has determined on the basis of (i) battery information stored in the management information database 122 and (ii) the distance from the current position of the motor-assisted bicycle 3 to the destination (return location) that it will be difficult to continue to travel to the destination without changing motor-assisted bicycles 3, the location specifying section 115 extracts a shared-vehicle standby location 2 on the route which shared-vehicle standby location 2 is suitable for the user to change motor-assisted bicycles 3. This example assumes that the location specifying section 115 has determined that a shared-vehicle standby location 2 at Station KK is suitable.

The location specifying section 115 causes the bicycle-mounted terminal 301 to display, for the user, information to the effect that the remaining power is low and information on a transfer location at which the user should change motor-assisted bicycles 3. The bicycle-mounted terminal 301 then navigates the user to the transfer location.

[Software Implementation Example]

Control blocks of the management server 1, the portable terminal 4, the bicycle-mounted terminal 301, and each shared-vehicle standby location 2 (particularly, the control section 101, the control section 405, the control section 311, the control section 211, and the control section 221) can each be realized by a logic circuit (hardware) provided in an integrated circuit (IC chip) or the like or can be alternatively realized by software as executed by a central processing unit (CPU).

In the latter case, each of the management server 1, the portable terminal 4, the bicycle-mounted terminal 301, and each shared-vehicle standby location 2 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

Recap

As described above, a management device in accordance with an aspect of the present invention includes: a management information database configured to store (i) positional information on each of a plurality of vehicle locations at each of which a shared vehicle having a battery is on standby, (ii) standby state information on the shared vehicle on standby at each of the plurality of vehicle locations, (iii) vehicle status information on a remaining battery power of a first shared vehicle that a user is using and on a current position of the first shared vehicle, and (iv) destination information on a desired destination at which the user wants to return the first shared vehicle; a location specifying section configured to, in a case where the location specifying section has determined with reference to the management information database that the remaining battery power of the first shared vehicle is not enough to continue traveling to the desired destination, specify a first vehicle location to be used by the user to change the first shared vehicle to a second shared vehicle; and a notifying section configured to notify a terminal device, operated by the user, of the first vehicle location.

With the above configuration, while a user is using a shared vehicle, the location specifying section refers to the management information database to determine whether the remaining battery power of the shared vehicle is not enough to continue to travel from the current position of the user to the destination, and if the remaining battery power is not enough, specifies a vehicle location (transfer location) to be used by the user to change shared vehicles. The location specifying section, in other words, determines whether the remaining battery power of a shared vehicle that a user is using is not enough, on the basis of information on the destination desired (entered) by the user when the user requested to use the shared vehicle.

Specifically, in a case where the location specifying section has determined that the remaining battery power is not enough, the location specifying section extracts, as a transfer location candidate, a vehicle location present within a predetermined range from the route from the current position of the user to the destination. The location specifying section then refers to the management information database to (i) extract a vehicle location(s) at which a shared vehicle(s) is on standby that is capable of continuing to travel to the destination and (ii) specify a transfer location among the vehicle location(s). The notifying section notifies a terminal device, operated by the user, of information on the transfer location specified. The user changes shared vehicles at that vehicle location (transfer location).

The location specifying section specifying a transfer location for the user as described above allows different vehicle locations to be used for transfer with similar frequencies as compared to a case where the user selects a desired transfer location.

In a case where, for instance, there is a road along the route to the destination which road will reduce the battery power greatly, the above configuration allows the location specifying section to (i) determine in advance that the remaining battery power is not enough to continue to travel to the destination and (ii) specify, as a transfer location, a vehicle location present on the user's side of the road (which will reduce the battery power greatly). This prevents a situation such as the following: Many users change shared vehicles at a particular vehicle location present in a region that users reach after traveling along a road that reduces the battery power greatly. This results in that particular vehicle location being filled with shared vehicles on standby each having an insufficient remaining battery power. A user of a shared vehicle with a reduced remaining battery power will then be unable to change shared vehicles at the vehicle location, with the result of the battery running out.

The above configuration allows the user to use a shared vehicle having a battery with a reduced risk of the battery running out.

A management device in accordance with an aspect of the present invention may be configured such that the management information database is configured to store information on a plurality of standby location zones each of which is a geographical zone set so as to include at least one of the plurality of vehicle locations, and the location specifying section, with reference to the management information database, specifies the first vehicle location among at least one of the plurality of vehicle locations which at least one is included in a standby location zone among the plurality of standby location zones which standby location zone matches information on a current position of the user.

The above configuration allows the location specifying section to, with reference to the management information database, specify, among vehicle locations included in a standby location zone, a vehicle location (transfer location) to be used by the user to change shared vehicles. The standby location zone may be set so as to include a plurality of vehicle locations around a spot (such as a train station and a sightseeing spot) with a high demand for a vehicle location.

In a case where a user changes shared vehicles at a transfer location, the shared vehicle that the user has used thus far will be on standby at the transfer location (the battery will be charged). That shared vehicle on standby will then be used for rental or transfer by another user.

The location specifying section refers to the management information database to specify a transfer location as described above. This prevents (i) an excessively large number of shared vehicles from being on standby at a particular one of vehicle locations included in a standby location zone or (ii) all shared vehicles on standby at a particular one of vehicle locations included in a standby location zone from having an insufficient remaining battery power. This in turn makes it possible to offer a wider range of vehicle location options for rental and transfer, which improves the convenience of users.

A management device in accordance with an aspect of the present invention may be configured such that in a case where the location specifying section has received, from the terminal device, a destination change request for changing the desired destination to a new destination, the location specifying section, with reference to the management information database, specifies, among at least one of the plurality of vehicle locations which at least one is present within a predetermined range from the new destination, a second vehicle location to be used by the user to return the first shared vehicle.

The above configuration allows the user to change the desired destination during use of a shared vehicle. The location specifying section specifies, among vehicle locations present within a predetermined range from the destination, a vehicle location (return location) to be used by the user to return the shared vehicle.

The location specifying section then determines on the basis of the return location specified whether the remaining battery power of the shared vehicle that the user is using is not enough to continue to travel from the current position of the user to the return location, and if the remaining battery power is not enough, specifies a vehicle location (transfer location) to be used by the user to change shared vehicles.

A management device in accordance with an aspect of the present invention may be configured such that the standby state information includes information on an occupancy indicative of a ratio of (i) the number of shared vehicles currently accommodated by each of the plurality of vehicle locations to (ii) the number of shared vehicles that said each of the plurality of vehicle locations is capable of accommodating, and the location specifying section specifies the first or second vehicle location with further reference to the information on the occupancy.

The above configuration allows the location specifying section to specify a transfer location or a return location with use of the occupancy of each vehicle location as an index. Thus, in a case where the location specifying section specifies a transfer location or a return location in such a manner that, for instance, the respective occupancies of the vehicle locations will be similar to one another, the respective frequencies of use of the vehicle locations can be leveled off.

A management device in accordance with an aspect of the present invention may be configured such that the terminal device stores information on a current position of the terminal device, and the destination change request is a request for changing the desired destination to the current position of the terminal device.

In a case where a user wants to return, somewhere near the current position, the shared vehicle that the user is using, the above configuration saves trouble of an input operation when the user requests to change the destination.

In order to attain the above object, a shared vehicle in accordance with an aspect of the present invention is a shared vehicle including: a vehicle-mounted terminal connected communicably to the management device; an input accepting section configured to receive an input from a user; a battery information obtaining section configured to obtain information on a remaining battery power of the shared vehicle; a position information obtaining section configured to obtain information on a current position of the shared vehicle; a transmitting section configured to transmit, to the management device, the information on the remaining battery power and the information on the current position; and a display section configured to display information on the first vehicle location of which the shared vehicle has been notified by the notifying section.

The above configuration allows a vehicle-mounted terminal to obtain various items of information and transmits those items of information to the management device. The above configuration also allows the vehicle-mounted terminal to (i) display information (instruction about a transfer location) of which the vehicle-mounted terminal has been notified by the management device and thereby (ii) notify the user.

In order to attain the above object, a vehicle sharing system in accordance with an aspect of the present invention is a vehicle sharing system, including: the management device; and a vehicle-mounted terminal for the shared vehicle, the management device and the vehicle-mounted terminal being connected communicably to each other.

With the above configuration, the vehicle sharing system allows the user to use a shared vehicle having a battery with a reduced risk of the battery running out.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Management server (management device)
2 Shared-vehicle standby location (vehicle location)
3 Motor-assisted bicycle (shared vehicle)
4 Portable terminal (terminal device)
10 Bicycle sharing system (vehicle sharing system)
20 Standby location zone
103 Communication section (reservation request receiving section, notifying section)
113 Reservation request condition searching section (location specifying section)
114 Reservation possibility determining section (location specifying section)
115 Location specifying section
122 Management information database
301 Bicycle-mounted terminal (vehicle-mounted terminal)
302 Battery
312 Input section (input accepting section)
313 Display section
314 Current position information detecting section (position information obtaining section)
315 Battery information detecting section (battery information obtaining section)
316 Communication section (transmitting section)

The invention claimed is:

1. A management device, comprising:
a management information database configured to store (i) positional information on each of a plurality of vehicle locations at each of which a shared vehicle having a battery is on standby, (ii) standby state information on the shared vehicle on standby at each of the plurality of vehicle locations, (iii) vehicle status information on a remaining battery power of a first shared vehicle that a user is using and on a current position of the first shared vehicle, and (iv) destination information on a desired destination at which the user wants to return the first shared vehicle;
a location specifying section, which is realized by a logic circuit (hardware) provided in an integrated circuit (IC chip) or software as executed by a central processing unit (CPU), configured to, in a case where the location specifying section has determined with reference to the management information database that the remaining battery power of the first shared vehicle is not enough to continue traveling to the desired destination, specify a first vehicle location to be used by the user to change the first shared vehicle to a second shared vehicle; and
a notifying section configured to notify a terminal device, operated by the user who is using the first shared vehicle, of the first vehicle location over a communication network, wherein the notifying section sends a notification of the first vehicle location over at which a transfer is performed during use of the first shared vehicle by the user, and wherein the user carries out the transfer to switch to the second shared vehicle from the first shared vehicle.

2. The management device according to claim 1, wherein the management information database is configured to store information on a plurality of standby location zones each of which is a geographical zone set so as to include at least one of the plurality of vehicle locations, and
the location specifying section is configured to, with reference to the management information database, specify the first vehicle location among at least one of the plurality of vehicle locations which at least one is included in a standby location zone among the plurality of standby location zones which standby location zone matches information on a current position of the user.

3. The management device according to claim 1, wherein the location specifying section is configured to, in a case where the location specifying section has received, from the terminal device, a destination change request for changing the desired destination to a new destination, specify, with reference to the management information database and among at least one of the plurality of vehicle locations which at least one is present within a predetermined range from the new destination, a second vehicle location to be used by the user to return the first shared vehicle.

4. The management device according to claim 3, wherein the terminal device stores information on a current position of the second shared vehicle, and
the destination change request is a request for changing the desired destination to the current position of the second shared vehicle.

5. The management device according to claim 1, wherein the standby state information includes information on an occupancy indicative of a ratio of (i) the number of shared vehicles currently accommodated by each of the plurality of vehicle locations to (ii) the number of shared vehicles that said each of the plurality of vehicle locations is capable of accommodating, and
the location specifying section is configured to specify the first or second vehicle location with further reference to the information on the occupancy.

6. The management device according to claim 1, wherein using the first shared vehicle comprises traveling between parking lots.

7. A vehicle sharing system, comprising:
a management device comprising:
a management information database configured to store (i) positional information on each of a plurality of vehicle locations at each of which a shared vehicle having a battery is on standby, (ii) standby state information on the shared vehicle on standby at each of the plurality of vehicle locations, (iii) vehicle status information on a remaining battery power of a first shared vehicle that a user is using and on a current position of the first shared vehicle, and (iv) destination information on a desired destination at which the user wants to return the first shared vehicle;
a location specifying section configured to, in a case where the location specifying section has determined with reference to the management information database that the remaining battery power of the first shared vehicle is not enough to continue traveling to the desired destination, specify a first vehicle location to be used by the user to change the first shared vehicle to a second shared vehicle; and
a notifying section configured to notify a terminal device, operated by the user who is using the first shared vehicle, of the first vehicle location over a communication network, wherein the notifying section sends a notification of the first vehicle location over at which a transfer is performed during use of the first shared vehicle by the user, and wherein the user carries out the transfer to switch to the second shared vehicle from the first shared vehicle; and
a vehicle-mounted terminal for the first shared vehicle, the first shared vehicle comprising:
an input accepting section configured to receive an input from the user;
a battery information obtaining section configured to obtain information on the remaining battery power of the first shared vehicle;
a position information obtaining section configured to obtain information on the current position of the first shared vehicle;
a transmitting section configured to transmit, to the management device, the information on the remaining battery power and the information on the current position over the communication network; and
a display device configured to display information on the first vehicle location of which the first shared vehicle has been notified by the notifying section and the notification of the first vehicle location over at which the transfer is performed,
the management device and the vehicle-mounted terminal being connected communicably to each other.

8. A computer-readable non-transitory storage medium storing therein an information processing program for causing a computer to function as a management device, the program causing the computer to function as each of the foregoing section, the management device comprising:
a management information database configured to store (i) positional information on each of a plurality of vehicle locations at each of which a shared vehicle having a battery is on standby, (ii) standby state information on the shared vehicle on standby at each of the plurality of vehicle locations, (iii) vehicle status information on a remaining battery power of a first shared vehicle that a user is using and on a current position of the first shared vehicle, and (iv) destination information on a desired destination at which the user wants to return the first shared vehicle;
a location specifying section, which is realized by a logic circuit (hardware) provided in an integrated circuit (IC chip) or software as executed by a central processing unit (CPU), configured to, in a case where the location specifying section has determined with reference to the management information database that the remaining battery power of the first shared vehicle is not enough to continue traveling to the desired destination, specify a first vehicle location to be used by the user to change the first shared vehicle to a second shared vehicle; and
a notifying section configured to notify a terminal device, operated by the user who is using the first shared vehicle, of the first vehicle location over a communication network, wherein the notifying section sends a notification of the first vehicle location over at which a transfer is performed during use of the first shared vehicle by the user, and wherein the user carries out the transfer to switch to the second shared vehicle from the first shared vehicle.

9. A computer-readable non-transitory storage medium storing therein an information processing program for causing a computer to function as a vehicle-mounted terminal for a shared vehicle, the program causing the computer to function as each of the foregoing sections, the shared vehicle comprising:
a vehicle-mounted terminal connected communicably to a management device, the management device comprising:
a management information database configured to store (i) positional information on each of a plurality of vehicle locations at each of which a shared vehicle having a battery is on standby, (ii) standby state information on the shared vehicle on standby at each of the plurality of vehicle locations, (iii) vehicle status information on a remaining battery power of a first shared vehicle that a user is using and on a current position of the first shared vehicle, and (iv) destination information on a desired destination at which the user wants to return the first shared vehicle;
a location specifying section, which is realized by a logic circuit (hardware) provided in an integrated circuit (IC chip) or software as executed by a central processing unit (CPU), configured to, in a case where the location specifying section has determined with reference to the management information database that the remaining battery power of the first shared vehicle is not enough to continue traveling to the desired destination, specify a first vehicle location to be used by the user to change the first shared vehicle to a second shared vehicle;

a notifying section configured to notify a terminal device, operated by the user who is using the first shared vehicle, of the first vehicle location over a communication network, wherein the notifying section sends a notification of the first vehicle location over at which a transfer is performed during use of the first shared vehicle by the user, and wherein the user carries out the transfer to switch to the second shared vehicle from the first shared vehicle;

an input accepting section configured to receive an input from a user;

a battery information obtaining section configured to obtain information on a remaining battery power of the first shared vehicle;

a position information obtaining section configured to obtain information on a current position of the first shared vehicle;

a transmitting section configured to transmit, to the management device, the information on the remaining battery power and the information on the current position over the communication network; and a display device configured to display information on the first vehicle location of which the first shared vehicle has been notified by the notifying section and the notification of the first vehicle location over at which the transfer is performed.

* * * * *